US008281299B2

(12) United States Patent
Siskind et al.

(10) Patent No.: US 8,281,299 B2
(45) Date of Patent: Oct. 2, 2012

(54) MAP-CLOSURE: A GENERAL PURPOSE MECHANISM FOR NONSTANDARD INTERPRETATION

(75) Inventors: Jeffrey Mark Siskind, West Lafayette, IN (US); Barak Avrum Pearlmutter, Dublin (IR)

(73) Assignee: Purdue Research Foundation, West Lafayette, IN (US)

( * ) Notice: Subject to any disclaimer, the term of this patent is extended or adjusted under 35 U.S.C. 154(b) by 1327 days.

(21) Appl. No.: 11/939,357

(22) Filed: Nov. 13, 2007

(65) Prior Publication Data

US 2008/0163188 A1    Jul. 3, 2008

Related U.S. Application Data

(60) Provisional application No. 60/865,302, filed on Nov. 10, 2006.

(51) Int. Cl.
*G06F 9/44* (2006.01)
*G06F 9/45* (2006.01)

(52) U.S. Cl. ......... 717/168; 717/114; 717/116; 717/120

(58) Field of Classification Search ........................ None
See application file for complete search history.

(56) References Cited

U.S. PATENT DOCUMENTS

| | | | | |
|---|---|---|---|---|
| 5,590,332 | A | * | 12/1996 | Baker ........................... 717/151 |
| 5,752,035 | A | * | 5/1998 | Trimberger ................... 717/153 |
| 6,223,341 | B1 | | 4/2001 | Bittner et al. |
| 6,397,380 | B1 | | 5/2002 | Bittner et al. |
| 6,483,514 | B1 | | 11/2002 | Duff |
| 6,718,291 | B1 | | 4/2004 | Shapiro et al. |
| 6,839,712 | B1 | * | 1/2005 | Kumhyr et al. ............... 717/108 |
| 6,895,574 | B2 | | 5/2005 | Walster et al. |
| 6,915,320 | B2 | | 7/2005 | Walster et al. |
| 6,920,472 | B2 | | 7/2005 | Walster et al. |
| 6,990,230 | B2 | | 1/2006 | Piponi |
| 6,999,096 | B2 | | 2/2006 | Sato |
| 7,743,363 | B2 | * | 6/2010 | Brumme et al. ............... 717/120 |
| 2003/0033339 | A1 | | 2/2003 | Walster et al. |
| 2004/0015830 | A1 | | 1/2004 | Reps |
| 2004/0133885 | A1 | | 7/2004 | Giering et al. |

(Continued)

FOREIGN PATENT DOCUMENTS

WO    9840828    9/1998

(Continued)

OTHER PUBLICATIONS

Siskind et al. "Firs-Class Nonstandard Interpretation by Opening Closure", Jan. 17, 2007, Purdue University, USA, pp. 1-8.*

(Continued)

*Primary Examiner* — Isaac Tecklu
(74) *Attorney, Agent, or Firm* — John V. Daniluck; Bingham Greenebaum Doll LLP

(57) ABSTRACT

The disclosed system provides a functional programming construct that allows convenient modular run-time nonstandard interpretation via reflection on closure environments. This construct encompasses both the ability to examine the contents of a closure environment and to construct a new closure with a modified environment. Examples of this powerful and useful construct support such tasks as tracing, security logging, sandboxing, error checking, profiling, code instrumentation and metering, run-time code patching, and resource monitoring. It is a non-referentially-transparent mechanism that reifies the closure environments that are only implicit in higher-order programs. A further example provides a novel functional-programming language that supports forward automatic differentiation (AD).

23 Claims, 6 Drawing Sheets

```
(define (set-in n v c)
  (cond ((procedure? c)
         (map-closure (lambda (n1 v1) (if (name=? n n1) v (set-in n v v1))) c))
        ((pair? c) (cons (set-in n v (car c)) (set-in n v (cdr c))))
        (else c)))

(define (set n v)
  (call/cc (lambda (c) ((set-in n v c) #f))))

(define-syntax set! (syntax-rules () ((set! x e) (set (name x) e))))
```

U.S. PATENT DOCUMENTS

| | | | |
|---|---|---|---|
| 2004/0236806 A1 | 11/2004 | Turner | |
| 2006/0111881 A1 | 5/2006 | Jackson | |
| 2008/0163188 A1* | 7/2008 | Siskind et al. | 717/168 |
| 2009/0077543 A1* | 3/2009 | Siskind et al. | 717/136 |

FOREIGN PATENT DOCUMENTS

| | | |
|---|---|---|
| WO | 02061662 | 8/2002 |
| WO | 2004047008 | 6/2004 |

OTHER PUBLICATIONS

Andreev, V. Non-standard analysis, automatic differentiation, Haskell, and other stories. Dec. 4, 2006, downloaded Oct. 8, 2007 from: http://vandreev.wordpress.com/2006/12/04/non-standard-analysis-and-automatic-differentiation/.

Augustsson, L Overloading Haskell numbers, part 2, Forward Automatic Differentiation. Apr. 14, 2007, downloaded Oct. 8, 2007 from: http://augustss.blogspot.com/2007/04/overloading-haskell-numbers-part-2.html.

Coleman, TF et al. ADMIT-1: Automatic Differentiation and MATLAB Interface ToolboxACM Transactions on Mathematical Software, vol. 26, No. 1, Mar. 2000, pp. 150-175.

Nilsson H. Functional Automatic Differentiation with Dirac Impulses. ICFP'03 Aug. 25-27, 2003, Uppsala, Sweden.

J.M. Siskind and B.A. Pearlmutter, Perturbation Confusion and Referential Transparency: Correct Functional Implementation of Forward-Mode AD, Draft Proceedings of the 17th International Workshop on Implementation and Application of Functional Languages (IFL2005), Dublin, Ireland.

Jeffrey Mark Siskind and Barak A. Pearlmutter, Nesting Forward-Mode AD in a Functional Framework Issues of Referential Transparency and their Resolution, ICFP 2006, pp. 1-8.

Barak A. Pearlmutter and Jeffrey Mark Siskind, Reverse-Mode AD in a Functional Framework: Lambda the Ultimate Backpropagator, ACM Transactions on Programming Languages and Systems, pp. 1-35.

Barak A. Pearlmutter and Jeffrey Mark Siskind, Lazy Multivariate Higher-Order Forward-Mode AD, POPL 2007, pp. 1-6.

Barak A. Pearlmutter and Jeffrey Mark Siskind, AD of Functional Programs: Lambda, the Ultimate Calculus, ACM SIGPLAN-SIGACT Symposium on Principles of Programming Languages (POPL 2005), pp. 1-15.

Jeffrey Mark Siskind and Barak A. Pearlmutter, Map-Closure: Closure Conversion :: CALL/CC : CPS Conversion CPS conversion + closure conversion = store conversion and call/cc + map-closure = setl, ICFP, pp. 1-5.

Jeffrey Mark Siskind and Barak A. Pearlmutter, Backpropagation Through Functional Programs How to do Reverse-Mode AD Correctly in a Functional Framework, POPL, pp. 1-12.

Jeffrey Mark Siskind and Barak A. Pearlmutter, First-Class Nonstandard Interpretations by Opening Closures, POPL 2007, pp. 1-6.

Jeffrey Mark Siskind and Barak A. Pearlmutter, Nesting Forward-Mode AD in a Functional Framework, Kluwer Academic Publishers, pp. 1-18.

* cited by examiner

```
(C c (quote v))         →   (quote v)
(C c (name x))          →   (name x)
(C c x)                 →   (lookup (name x) c)
(C c (lambda (x) e))    →   (cons (lambda (c₁ x)
                                (let ((c₂ (cons (cons (name x) x) c₁)))
                                    (C c₂ e)))
                            (list (cons (name x₁) (C c x₁)) ...))
                            where x₁...are free in (lambda (x) e)
(C c (e₁ e₂)))          →   (let ((x (C c e₁))) ((car x) (cdr x) (C c e₂)))
e₀                      →   (let ((x₁ (cons (lambda (c x) (x₁ x)) '()))  ...
                                (cons-procedure
                                    (cons (lambda (c1 x1) (cons (lambda (c2 x2) (cons x1 x2)) '()) '()))
                                (map-closure
                                    (cons (lambda (c (cons (cons f fc) (cons g gc)))
                                        (cons g (map (lambda (gn gv) (cons gn  (f fc gn gv)) gc)))
                                        '()))
                                (pair? (cons (lambda (c x) (and (pair? x) (not (procedure? (car x)))))
                                    '()))
                                (procedure? (cons (lambda (c x) (and (pair? x) (procedure? (car x))))
                                    '()))
                                (let ((x (list (cons (name x₁) x₁) ...
                                            (cons (name cons-procedure) cons-procedure)
                                            (cons (name map-closure) map-closure)
                                            (cons (name pair?) pair?)
                                            (cons (name procedure?) procedure?))))
                                    (C x e₀)))
                            where x₁ ... are free in e₀ except cons-procedure, map-closure, pair?, and procedure?. This
                            assumes that x₁ ... are bound to procedures that don't internally invoke procedural arguments.
```

*Fig. 1*

```
(C c (quote v))      →    (c (quote v))
(C c (name x))       →    (c (name x))
(C c x)              →    (c x)
(C c (lambda (x) e)) →    (c (lambda (c₁ x) (C c₁ e)))
(C c (e₁ e₂))        →    (C (lambda (x₁) (C (lambda (x₂) (x₁ c x₂)) e₁)) e₂)
e₀                   →    (let ((x₁ (lambda (c x) (c (x₁ x)))) ...
                            (call/cc (lambda (c x1) (x1 c (lambda (c2 x2) (c x2)))))
                            (cons-procedure
                              (lambda (c1 x1) (c1 (lambda (c2 x2) (c2 (cons x1 x2))))))
                            (map-closure
                              (lambda (c (cons f g))
                                (c (map-closure (lambda (x) (f (lambda (x) x) x)) g)))))
                           (C (lambda (x) x) e₀))

where x₁ ... are free in e₀ except call/cc, cons-procedure, and map-closure. This assumes that
x₁ ... are bound to procedures that don't internally invoke procedural arguments.
```

*Fig. 2*

```
(define (set-in n v c)
  (cond ((procedure? c) c)
        ((pair? c) (cons (set-in n v (car c)) (set-in n v (cdr c))))
        (else c)))

(define (set n v)
  (call/cc (lambda (c) ((set-in n v c) #f))))

(define-syntax set! (syntax-rules () ((set! x e) (set (name x) e))))
```

*Fig. 3*

```
(define (trace thunk)
  ((let wrap ((x thunk))
     (cond ((pair? x) (cons (wrap (car x)) (wrap (cdr x))))
           ((procedure? x)
            (lambda (arguments)
              (write (list +1 procedure arguments))
              (newline)
              (let ((result ((map-closure (lambda (n x) (wrap x)) x) arguments)))
                (write (list -1 procedure results))
                (newline)
                result))))
           (else x))))))
(define (sandbox allowed? raise-exception thunk)
  ((let wrap ((x thunk))
     (cond ((pair? x) (cons (wrap (car x)) (wrap (cdr x))))
           ((procedure? x)
            (lambda (arguments)
              (if (allowed? x arguments) ((map-closure (lambda (n x) (wrap x)) x) arguments) (raise-exception))))
           (else x))))))
(define (profile thunk)
  (let* ((table '()))
    (result ((let wrap ((x thunk))
               (cond ((pair? x) (cons (wrap (car x)) (wrap (cdr x))))
                     ((procedure? x)
                      (lambda (arguments)
                        (set! table (let increment ((table table))
                                      (cond ((null? table) (list (cons x 1)))
                                            ((eq? (car (car table)) x)
                                             (cons (cons (car (car table)) (+ (cdr (car table)) 1)) (cdr table)))
                                            (else (cons (car table) (increment (cdr table)))))))
                        ((map-closure (lambda (n x) (wrap x)) x) arguments)))
                     (else x))))))
    (write table)
    (newline)
    result))
```

*Fig. 4A*

```
(define (patch old new)
  (call/cc (lambda (c)
    ((let wrap ((x c))
       (cond ((eq? x old) new)
             ((pair? x) (cons (wrap (car x)) (wrap (cdr x))))
             ((procedure? x) (map-closure (lambda (n x) (wrap x)) x))
             (else x)))
     #f))))

(define (room)
  (let ((pairs 0) (slots 0) (objects '()))
    (call/cc (lambda (c)
      (let walk ((x c))
        (cond ((memq x objects) #f)
              (else (set! objects (cons x objects))
                    (cond ((pair? x) (set! pairs (+ pairs 1)) (walk (car x)) (walk (cdr x)))
                          ((procedure? x) (map-closure (lambda (n x) (set! slots (+ slots 1)) (walk x)) x)))))))) 
    (list pairs slots)))
```

*Fig. 4B*

MAP-CLOSURE: A GENERAL PURPOSE MECHANISM FOR NONSTANDARD INTERPRETATION

REFERENCE TO RELATED APPLICATIONS

This application claims priority to U.S. Provisional Patent Application 60/865,302, filed Nov. 10, 2006, and titled "Map-Closure: A General Purpose Mechanism for Nonstandard Interpretation," which is hereby incorporated herein by reference as if fully set forth. This application is also related to U.S. application Ser. No. 11/875,691, filed Oct. 19, 2007, and titled "Automatic Derivative Method for a Computer Programming Language," which is also incorporated herein by reference.

STATEMENT REGARDING GOVERNMENT-SPONSORED RESEARCH

This innovation was sponsored in part by NSF grant CCF-0438806 and in part by Science Foundation Ireland grant 00/PI.1/C067. The US Government may have certain rights in the invention.

FIELD

The present disclosure relates to computing equipment for processing computer programs. More specifically, this disclosure relates to compilers, interpreters, and other systems that process functional programs that include automatic differentiation facilities.

BRIEF DESCRIPTION OF THE DRAWINGS

FIG. 1 is a closure-conversion implementation that applies to a top-level expression $e_0$.

FIG. 2 is CPS-conversion code that applies to a top-level expression $e_0$.

FIG. 3 is an implementation of set! using map-closure and call/cc.

FIG. 4 is an illustration of typical LISP and SCHEME system functionality implemented as user code with map-closure.

DESCRIPTION

Figure 5:
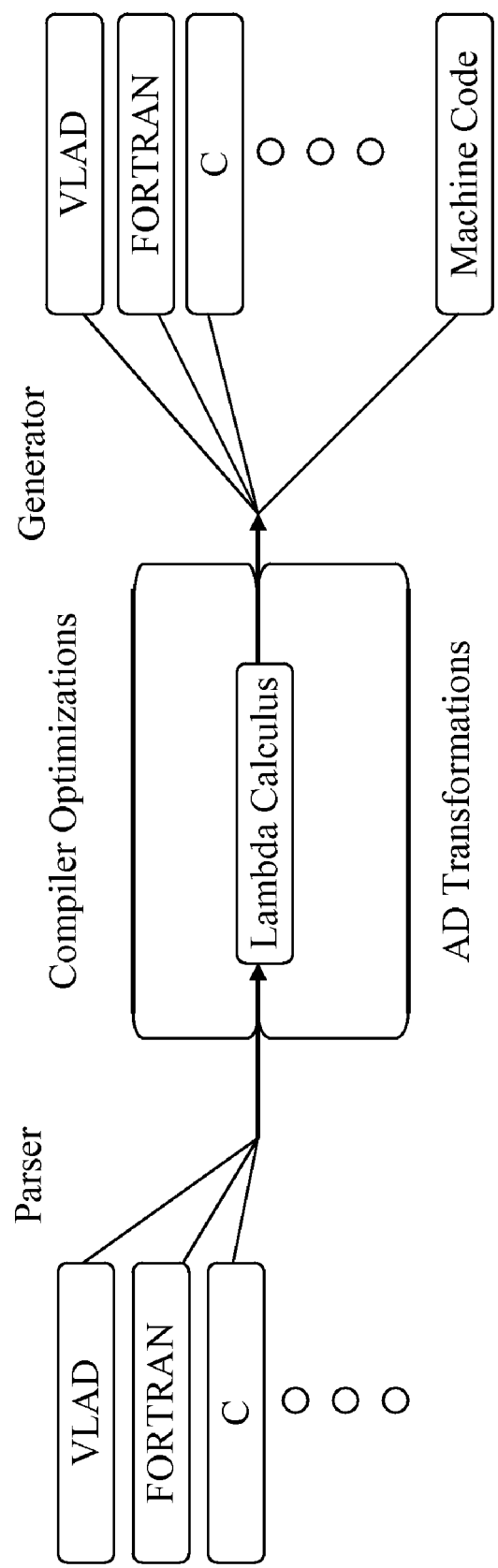
FIG. 5 is a flow diagram illustrating the role of the lambda calculus in a variety of systems that use AD transformations.

For the purpose of promoting an understanding of the principles of the present disclosure, reference will now be made to the embodiment illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the invention relates.

Generally, one form of the present system is a novel system for applying nonstandard interpretation to computer programs.

1 First-Class Nonstandard Interpretations by Opening Closures

In this section we motivate and discuss a novel functional programming construct that allows convenient modular run-time nonstandard interpretation via reflection on closure environments. This map-closure construct encompasses both the ability to examine the contents of a closure environment and to construct a new closure with a modified environment. From the user's perspective, map-closure is a powerful and useful construct that supports such tasks as tracing, security logging, sandboxing, error checking, profiling, code instrumentation and metering, run-time code patching, and resource monitoring. From the implementer's perspective, map-closure is analogous to call/cc. Just as call/cc is a non-referentially transparent mechanism that reifies the continuations that are only implicit in programs written in direct style, map-closure is a non-referentially-transparent mechanism that reifies the closure environments that are only implicit in higher-order programs. Just as CPS conversion is a non-local but purely syntactic transformation that can eliminate references to call/cc, closure conversion is a non-local but purely syntactic transformation that can eliminate references to map-closure. We show how the combination of map-closure and call/cc can be used to implement set! as a procedure definition and a local macro transformation.

1-1 Motivation

Nonstandard interpretation is a powerful tool, with a wide variety of important applications. Typical techniques for performing nonstandard interpretation are compile-time only, require modification of global resources, or require rewriting of code to abstract over portions subject to nonstandard semantics. This paper proposes a construct to support modular run-time nonstandard interpretation. For expository purposes, let us consider a very simple example of nonstandard interpretation. Suppose one wished to add complex numbers and complex arithmetic to a programming-language implementation that supports only real arithmetic. One might represent the complex number a+bi as an Argand pair (a,b). Extending the programming language to support complex arithmetic can be viewed as a nonstandard interpretation where real numbers r are lifted to complex number (r, 0), and operations such as $+:R \times R \to R$ are lifted to $+:C \times C \to C$.

$(a_1,b_1)+(a_1+a_2,b_1+b_2)$

One can accomplish this in SCHEME by redefining the arithmetic primitives, such as +, to operate on combinations of native SCHEME reals and Argand pairs ha, bi represented as SCHEME pairs (a.b). For expository simplicity, we ignore the fact that many of SCHEME's numeric primitives can accept a variable number of arguments. We define a new procedure lift-+ which we use to redefine + at the top level.

```
(define (lift-+ +)
 (lambda (x y)
  (let ((x (if (pair? x) x (cons x 0)))
   (y (if (pair? y) y (cons y 0)))
   (cons (+ (car x) (car y))
    (+ (cdr x) (cdr y))))))
(define + (lift-+ +))
```

This raises an important modularity issue. With the above definition, on can take a procedure f defined as (define (f x) (+x x))

and correctly evaluate (f'(2.3)) to (4.6). Once can even take a procedure g defined as (define g (let ((y 10)) (lambda (x) (+x y))))

and correctly evaluate (g'(1.2)) to (11.2). Theses examples work correctly irrespective of whether f and g are defined before or after +is redefined. In contrast, consider (define h (let ((p+)) (lambda (x) (p x 5))))

The expression (h'(1.2)) will evaluate correctly to (6.2) only if h was defined after + has been redefined. This is not the only modularity issue raised by this common technique: for instance, one might wish to confine the nonstandard interpretation to a limited context; one might wish to perform different nonstandard interpretations, either singly or cascaded; and one might wish to avoid manipulation of global resources.

The remainder of this paper discusses a novel mechanism, map-closure, which allows such nonstandard interpretation in code written in a functional style, and which avoids these modularity issues. As discussed in section 4, map-closure is a powerful and useful construct that supports such tasks as tracing, security logging, sandboxing, error checking, profiling, code instrumentation and metering, run-time patching, and resource monitoring.

1-2 A Functional Subset of SCHEME

We formulate these ideas using a simple functional language that resembles SCHEME, differing in the following respects:

The only data types supported are Booleans, reals, pairs, and procedures.

Only a subset of the built-in SCHEME procedures and syntax are supported.

Rest arguments are not supported.

The constructs cons and list are macros:
  (cons $e_1$ $e_2$) ⇝ ((cons-procedure $e_1$) $e_2$)
  (list) ⇝ '( )
  (list $e_1$ $e_2$ ... ) ⇝ (cons $e_1$ (list $e_2$ ... ))

Procedure parameters p can be variables, '( ) to indicate an argument that is ignored, or (cons p1 p2) to indicate the appropriate destructuring.

All procedures take exactly one argument and return exactly one result. This is accomplished in art by the basis, in part by the following transformations:
  ($e_1$) ⇝ ($e_1$ '( ))
  ($e_1$ $e_2$ $e_3$ $e_4$ ... ) ⇝ ($e_1$ (cons* $e_2$ $e_3$ $e_4$ ... ))
  (lambda ( ) e) ⇝ (lambda ((cons*)) e)
  (lambda ($p_1$ $p_2$ $p_3$ .... ) e)
    ⇝ (lambda ((cons* $p_1$ $p_2$ $p_3$ ... )) e)
together with a cons* macro
  (cons*) ⇝ ( )
  (cons* $e_1$) ⇝ $e_1$
  (cons* $e_1$ $e_2$ $e_3$ ... ) ⇝ (cons $e_1$ (cons $e_1$ (cons* $e_2$ $e_3$ ... )))
and by allowing list and cons* as parameters.

The above, together with the standard SCHEME macro expansions, a macro for if
  (if $e_1$ $e_2$ $e_3$) ⇝
    ((if-procedure $e_1$ (lambda ( ) $e_2$) (lambda ( ) $e_3$)))
and a transformation of letrec into the Y-combinator suffice to transform any program into the following core language:
  e::=(quote υ)|x|($e_1$,$e_2$)|(lambda (x) e)

1-3 Closure Conversion

The essence of closure conversion is to reify environments that contain the values of free variables in procedures by replacing procedures with pairs of environments and a transformed procedure. These transformed procedures have no free variables, and instead access the values of free variables from the reified environment passed as an argument. This can be implemented as a purely syntactic source-to-source transformation, as shown in FIG. 1.

We omit a number of bookkeeping details tangential to the issues we wish to explore. However, one bookkeeping issue relevant to our purpose does arise. We would like our new reflective mechanism to be invariant to choice of variable names. We therefore introduce a new data type, name, to key environments. The interface for names consists of the procedures name? and name=?, and the syntax (name x) which returns a unique name associated with the (potentially alpha-renamed) variable x. Given this transformation, map-closure can be transformed to

```
(lambda (c (cons (cons f fc) (cons g gc)))
  (cons g
    (map (lambda (gn gv)
      (cons gn (f fc gn gv)))
      gc)))
```

The techniques described in this section and shown in FIG. 1 suffice to implement the examples herein. While the simple implementation in FIG. 1 represents reified closure environments as alists and transformed procedures as pairs, map-closure does not expose this structure. An alternate implementation could thus use an alternate representation with suitable replacements for lookup, map, and the locations in the transformation where closures are constructed. Such an implementation might represent names as offsets into environment tuples.

1-4 The Utility of Map-Closure

Both alone and in combination with call/cc, map-closure is a powerful and general-purpose construct that can solve important software-engineering tasks. It is a portable mechanism for performing run-time dynamic nonstandard interpretation, a technique of increasing importance that arises in many guises ranging from security and debugging to web applications (mechanisms like AJAX that overload I/O operations to use HTTP/HTML). Consider the following examples as an indication of its myriad potential uses.

Programmers often desire the ability to examine an execution trace. FIG. 4 contains a trace procedure that traces all procedure entrances and exits during the invocation of thunk. Such a facility can easily be adapted to perform security logging.

Virtual machines are often able to execute code in a sandbox so as to constrain the allowed actions and arguments. FIG. 3 contains a sandbox procedure that invokes thunk in a context where all procedure invocations must satisfy the allowed? predicate or else the raise-exception procedure is called. Such a facility is useful both for security and error checking.

Many programming-language implementations contain a facility to profile code. FIG. 3 contains a profile procedure that constructs a table of the invocation counts of all procedures invoked during the invocation of thunk. Such a facility can easily be adapted to instrument and meter code in other ways.

One of the hallmarks of classical LISP implementations is the ability to patch code in a running system by changing the function bindings of symbols. The designers of COMMON LISP were aware that this mechanism could not be used to patch code referenced in closure slots. They addressed this with a kludge: treating a funcall to a symbol as a funcall to its function binding. FIG. 4 contains a more principled approach to this problem. The procedure patch replaces all live instances of old with new.

Finally, many programming-language implementations contain a facility to determine the amount of live storage. FIG. 4 contains a room procedure that returns a list of the number of live pairs and the number of live closure slots.

Facilities such as the above are normally implemented as system internals. FIG. 4 shows that many such facilities can be implemented as user code with map-closure.

1-5 Map-Closure+Call/cc=Set!

It is interesting to consider the application of map-closure to a continuation made explicit by call/cc. The source-to-source transformation of closure conversion described in section 4 does not allow this, because it does not closure-convert continuations. However, we could convert the program to continuation-passing style (CPS) first and then apply closure conversion, thus exposing all continuations to closure conversion as ordinary procedures. FIG. 2 describes this process. The transformations shown are standard, with one exception: the map-closure procedure itself needs to be handled specially, as (prior to closure conversion) it cannot be expressed as a user-defined procedure, and must be treated as a primitive. However, it is unique among primitives in that it invokes a procedural argument. Since this procedural argument will be in CPS after conversion, the CPS version of map-closure must invoke this argument with an appropriate continuation.

The combination of map-closure and call/cc is very powerful: it can be used to implement set! as a procedure definition in a language that does not have any built-in mutation operations. The intuition behind this is that set! changes the value of a variable for the remainder of the computation; call/cc exposes the remainder of the computation as a reified continuation; map-closure can make a new continuation just like the old one except that one particular variable has a new value; and thus invoking this new continuation instead of the old continuation has precisely the same result as set!. The simple definition shown in FIG. 2 accomplishes this intuition. There is, however, one minor complication: the recursion in set-in is necessary because the target variable might be present in closures nested in the environments of other closures. As a result unlike most SCHEME implementations, where set! takes constant time, the implementation in FIG. 2 must traverse the continuation to potentially perform substitution in multiple environments that close over the mutated variable.

While the ability to implement set! as a procedure definition combined with a local macro transformation is surprising and intriguing, it might be reasonable to consider this to be something of a curiosity. The combination of map-closure and call/cc is extremely powerful, and thus potentially difficult to implement efficiently. However map-closure in the absence of call/cc is still a useful construct for implementing nonstandard interpretation, and seems amenable to more efficient implementation. Thus, implementations supporting map-closure might not in general be expected to allow its application to continuations. Of the examples in FIG. 4, only patch and room rely on this ability.

1-6 Discussion

Functor-based module systems, overloading mechanisms such as aspect-oriented programming, and map-closure are related, in that all three support nonstandard interpretation. The difference is in the scope of that nonstandard interpretation. In a functor-based module system, the scope is lexical. With overloading, the scope is global. With map-closure, the scope is dynamic.

The dynamic scope of map-closure affords interesting control over modularity. One can apply a nonstandard interpretation to only part of a program. Or, different nonstandard interpretations to different parts of a program. Or, to different invocations of the same part of a program. One can compose multiple nonstandard interpretations, controlling the composition order when they do not commute. For example, composing complex arithmetic with logging arithmetic in different orders would allow one to control whether one logged the calls to complex arithmetic or the calls to the operations used to implement complex arithmetic. With map-closure, nonstandard interpretations become first-class entities.

If all aggregate data structures are Church-encoded as closures, CPS conversion followed by closure conversion subsumes store conversion: it explicitly threads a store, represented as an environment, through the program. However, compilers that perform both CPS conversion and closure conversion generally do so in the opposite order. Just as call/cc affords one the power of explicit continuations while allowing one to write in direct style, map-closure affords one the power of explicit closure environments while allowing one to write in higher-order style. The combination of call/cc and map-closure affords the power of explicit store threading while allowing one to write in a direct higher-order style.

In the implementation of set! in FIG. 3, the original continuation is not mutated but discarded. Instead of discarding this original continuation, it can be preserved and invoked later in order to implement such control structures as fluid-let and amb with associated side effects that are undone upon backtracking. Side effects that can be undone can be used to implement PROLOG-style logic variables and unification. All this can be implemented as defined procedures and local macro transformations in a language that has no explicit mutation operations, but that supports call/cc and map-closure, allowing map-closure to apply to continuations.

Like other powerful constructs, map-closure may seem difficult to implement efficiently. However, the same was said of constructs like recursion, dynamic typing, garbage collection, and call/cc when first introduced. Of particular concern is that it may appear that map-closure precludes compiler optimizations such as inlining, especially of primitive procedures. Well known techniques (e.g., declarations, module systems, and flow analysis) allow SCHEME compilers to perform inlining despite the fact that the language allows redefinition of (primitive) procedures. These techniques can be extended and applied to allow inlining in the presence of map-closure. Even without such techniques, map-closure does not preclude inlining: a compiler can generate whatever code it wishes, so long as the run-time system can reconstruct the closure-slot information that map-closure passes to its first argument, and any information needed to construct the result closure. Each invocation of map-closure might even perform run-time compilation, including optimizations such as inlining.

The history of programming-language research is replete with examples of powerful constructs that were initially eschewed for performance reasons but later became widely adopted as their power was appreciated and performance issues were addressed. We hope that this will also be the case for map-closure.

Note that, by design, map-closure does not expose the internal representation of closures and environments to the user. This design also preserves hygiene: the lexical hierarchy of variable scoping. Since map-closure does not allow one to add, remove, or rename variables, it is not possible to create unbound variable references or change the lexical scoping of variables through shadowing or unshadowing at run time.

An alternate, more traditional way to provide the functionality of map-closure would be to provide an interface to access the environment and code components of closures and construct new closures out of such environment and code components, along with an interface to access environment components and construct new environments. However, such an alternate interface would expose the internal representation of closures and environments to the user, perhaps via interfaces and data types that differ in detail between implementations, and might well break hygiene. On the other hand, map-closure exposes only one new data type: names as passed as the first argument to the first argument of map-closure. The values passed as the second argument to the first argument of map-closure and the values returned by the first argument of map-closure are ordinary SCHEME values.

Also note that names are opaque. They are created by new syntax to allow implementations to treat them as variables in every sense. They can only be compared via identity, so an implementation is free to represent names in the same way as variable addresses: stack offsets, absolute global addresses, etc. In fact, just as implementations can have different representations of variable addresses for variables of different types and lifetimes, implementations can have similarly different representations of names. Moreover names can be avoided entirely by using a weaker variant of map-closure that only exposes closure-slot values. Such a weaker variant suffices for many applications, including all examples here except for the implementation of set!.

Closure conversion is not the only implementation strategy for map-closure. For instance, a native implementation could operate directly on higher-order code. Such an implementation would only need a mechanism for accessing slots of existing closures and creating closures with specified values for their slots. These mechanisms already exist in any implementation of a higher-order language, and must simply be repackaged as part of the implementation of a map-closure primitive. Furthermore, native implementations of map-closure are possible in systems that use alternate closure representations, such as linked or display closures, unlike the flat-closure representation used here. While the implementation of map-closure for different representations of closures and environments would be different, programs that use map-closure would be portable across all such implementations. This is not the case with the aforementioned alternate interface.

Nonstandard interpretation is ubiquitous in programming language theory, manifesting itself in many contexts. It could be reasonably suggested that the lack of a simple way to easily perform a nonstandard interpretation may have held back the application of this powerful idea, and resulted in a great deal of implementation effort building systems that each perform some specific nonstandard interpretation. For this reason map-closure, or some other construct that provides first-class dynamic nonstandard interpretation, may prove a surprisingly handy tool. In fact, the authors have already found it quite useful in the implementation of automatic differentiation in a functional programming language.

2 Compiling a Higher-Order Functional-Programming Language with a First-Class Derivative Operator to Efficient Fortran-Like Code with Polyvariant Union-Free Flow Analysis We present a novel functional-programming language that supports forward automatic differentiation (AD). Typical implementations of forward AD use either overloading or source-to-source transformation to implement the nonstandard interpretation needed to perform forward AD. These offer complementary tradeoffs. Overloading can afford greater flexibility and expressiveness by allowing the user of a function to evaluate the derivative of that function, for some input value, without access to its source code. Source-to-source transformation can afford greater performance by eliminating the dispatching associated with overloading. Our language employs a novel approach to forward AD, providing a first-class higher-order function that conceptually performs source-to-source transformation of closure bodies at run time and an optimizing compiler that eliminates such run-time reflection using whole-program inter-procedural flow analysis. This provides both the greater flexibility and expressiveness of overloading and the greater efficiency of source-to-source transformation. We present several examples that demonstrate the superior performance of our approach when compared with a number of prior forward AD implementations for both functional and imperative languages.

2-1 Introduction

Numerical programmers face a tradeoff. They can use a high-level language, like MATLAB, that provides convenient access to mathematical abstractions like function optimization and differential equation solvers or they can use a low-level language, like FORTRAN, to achieve high computational performance. The convenience of high-level languages results in part from the fact that they support many forms of run-time dependent computation: storage allocation and automatic reclamation, data structures whose size is run-time dependent, pointer indirection, closures, indirect function calls, tags and tag dispatching, etc. This comes at a cost to the numerical programmer: the instruction stream contains a mix of floating-point instructions and instructions that form the scaffolding that supports run-time dependent computation. FORTRAN code, in contrast, achieves high floating-point performance by not diluting the instruction stream with such scaffolding.

This tradeoff is particularly poignant in the domain of automatic differentiation or AD. AD is a collection of techniques for evaluating the derivative of a function specified by a computer program at a particular input. In the next section, we review forward AD, the particular technique used in this section. Conceptually, at least, in its simplest form, forward AD can be provided with a simple API:

(derivative $f: \mathbb{R} \to \mathbb{R}x: \mathbb{R}): \mathbb{R}$ or a curried variant. The advantage of such a formulation as a higher-order function is that it allows construction of a whole hierarchy of mathematical concepts, like partial derivatives, gradients, function optimization, differential-equation solvers, etc. that are built upon the notion of a derivative. Moreover, once one defines such abstractions, it is natural and useful to be able to nest them, e.g., to optimize a function that in turn optimizes another function:

```
(optimize
    (lambda (x)
        (optimize (lambda (y) ...) ...))
    ...)
``` or to optimize a function that solves a differential equation:

```
(optimize
    (lambda (x)
        (solve-ode(lambda (y) ...) ...))
    ...)
```

Inter alia, this entails the cost of closures and indirect function calls. Moreover, as we will see in the next section, such a derivative operator typically evaluates f at x under a nonstandard interpretation. This is typically done by overloading the arithmetic primitives and thus often precludes inlining such primitives and often further entails the cost of tagging and tag dispatching.

Another approach to forward AD involves a preprocessor to perform a source-to-source transformation. Conceptually, at least, in its simplest form, this can be viewed as translating a function:

(double f(double x) { ... } into:

```
struct bundle double primal;
         double tangent;};
    struct bundle f_forward(double x) {...}
``` that returns a bundle of the primal value $f(x)$ and the tangent value $f'(x)$. When implemented properly, repeated application of this transformation can be used to produce variants of f that compute higher-order derivatives. Herein lies the inconvenience of this approach. Different optimizers might use derivatives of different order. Changing code to use a different optimizer would thus entail changing the build process to transform the objective function a different number of times. Moreover, the build process for nested application, such as the nested optimization shown above, would be tedious. One would need to transform the inner objective function, wrap it in a call to optimize, and then transform this resulting outer function.

The central contribution of this paper is a new language that provides a mechanism for defining a derivative operator that offers the convenience of the first approach with the efficiency of the second approach. Conceptually, at least, this mechanism involves run-time reflection on the body of f, when computing (derivative f), to transform it into something like f_forward. An optimizing compiler then uses whole-program inter-procedural flow analysis to eliminate such run-time reflection, as well as all other run-time scaffolding, to yield numerical code with FORTRAN-like efficiency.

Let us summarize the typical characteristics of numerical code and its associated execution model. Numerical code typically does not use union types and thus its execution model does not use tags and tag dispatching. In numerical code, all aggregate data typically has fixed size and shape that can be determined at compile time. Thus in the execution model, such aggregate data is unboxed and does not require indirection for data access and run-time allocation and reclamation. Numerical code is typically written in languages where primitive arithmetic operations are specified by special syntax and not as function calls. Thus in the execution model, such operations are inlined and do not entail function-call overhead. Numerical code typically does not use higher-order functions. Thus in the execution model, all function calls are to known targets and do not involve indirection or closures. Numerical code is typically written in languages that do not support reflection. Thus it does not reflectively access, modify, or create code during execution. We refer to such code and its corresponding execution model as FORTRAN-like. When properly compiled, FORTRAN-like numerical code can exhibit significantly greater performance than numerical code written in a non-FORTRAN-like style compiled with typical compilers.

We present a compiler that generates FORTRAN-like target code from a class of programs written in a higher-order functional programming language with a first-class derivative operator. Our compiler uses whole-program inter-procedural flow analysis to drive a code generator. Our approach to flow analysis differs from that typically used when generating non-FORTRAN-like code. First, it is polyvariant. Monovariant flow analyses like 0-CFA are unable to specialize higher-order functions. Polyvariant flow analysis is needed to do so. The need for polyvariant flow analysis is heightened in the presence of a higher-order derivative operator, i.e., one that maps functions to their derivatives. Second, it is union free. The absence of unions in the abstract interpretation supports generation of code without tags and tag dispatching. The further absence of recursion in the abstract interpretation means that all aggregate data will have fixed size and shape that can be determined by flow analysis allowing the code generator to use unboxed representations without indirection in data access or runtime allocation and reclamation. The polyvariant analysis determines the target of all call sites allowing the code generator to use direct function calls exclusively. This, combined with aggressive inlining, results in inlined arithmetic operations, even when such operations are conceptually performed by (overloaded) function calls. The polyvariant analysis unrolls finite instances of what is written conceptually as recursive data structures. This, combined with aggressive unboxing, eliminates essentially all manipulation of aggregate data, including closures. Our limitation to union-free analyses and finite unrolling of recursive data structures is not as severe a limitation as it may seem. The main limitation relative to FORTRAN-like code is that we currently do not support arrays. Finally, the polyvariant analysis performs finite instances of reflection, migrating such reflective access to and creation of code from run time to compile time.

The remainder of the paper is organized as follows. Section 5-2 reviews the technique of forward AD. Section 5-3 gives an informal discussion of the novel reflective mechanism of our language and how it supports forward AD. Section 5-4 discusses our language in greater detail. Section 5-5 discusses the flow-analysis techniques used in our compiler. Section 5-6 discusses how the results of flow analysis can be used to generate FORTRAN-like code. Section 5-7 presents examples that illustrate the effectiveness of our compiler. Section 5-8 discusses this work in a broader context.

2-2 Review of Forward AD

The Taylor expansion of $f(c+\epsilon)$ with respect to $\epsilon$ is:

$$f(c+\varepsilon) = \sum_{i=0}^{\infty} \frac{1}{i!} \frac{d^i f(x)}{dx^i}\bigg|_{x=c} \varepsilon^i$$

This implies that one can compute the i-th derivative of a univariate function $f$ at a scalar point c by evaluating $f(c+\epsilon)$ under a nonstandard interpretation replacing real numbers with univariate power series in $\epsilon$, extracting the coefficient of $\epsilon^i$ in the result, and multiplying this by i!. Traditional forward AD truncates the Taylor expansions at i>1, thus computing a representation that contains only the first derivative.

Such truncated Taylor expansions are dual numbers. We denote a dual number as $x+\overline{x}\epsilon$, by analogy with the standard notation a+bi for complex numbers. Just as arithmetic on complex numbers a+bi can be defined by taking $i^2=-1$, arithmetic on dual numbers $x+\overline{x}\epsilon$ can be defined by taking $\epsilon^2=0$ but $\epsilon\neq0$. Furthermore, just as implementations of complex arithmetic typically represent complex numbers a+bi as Argand pairs <a, b>, implementations of forward AD typically represent dual numbers $x+\overline{x}\epsilon$ as tangent-bundle pairs (x, $\overline{x}$).

Forward AD computes the derivative of a univariate function $f$ at a scalar point c by evaluating $f(c+\epsilon)$ under a nonstandard interpretation replacing real numbers with dual numbers and extracting the coefficient of $\epsilon$ in the result. To see how this works, let us manually apply the mechanism to a simple example: computing the first derivative of $f(x)=x^4+2x^3$ at $x=3$. To do this, we first evaluate $f(3+\epsilon)$:

$$f(3+\varepsilon) = (3+\varepsilon)^4 + 2(3+\varepsilon)^3$$
$$= (81 + 108\varepsilon) + 2(27 + 27\varepsilon)$$
$$= 135 + 162\varepsilon$$

From this we can extract the derivative 162. Note that the above makes use of the restriction that $\epsilon^2=0$ when evaluating the expressions $(3+\epsilon)^3=27+27\epsilon$ and $(3+\epsilon)^4=81+108\epsilon$, dropping the $\epsilon^2$, $\epsilon^3$, and $\epsilon^4$ terms. This is the essence of traditional forward AD when limited to the case of univariate derivatives.

Note that in the above, we use the notation of dual numbers, i.e., $x+\overline{x}\epsilon$, purely for expository purposes. Implementations typically do not symbolically evaluate expressions over polynomials or power series. Rather they manipulate tangent-bundle pairs $(x,\overline{x})$ in a fashion much like complex numbers.

Since at least as far back as 1964, forward AD has been widely used for scientific and engineering computation. (Since at least as far back as 1980, reverse AD has been widely used as well.) See www.autodiff.org for a plethora of implementations of forward (and reverse) AD in a multitude of programming languages.

Broadly speaking, there are two general classes of approaches for performing the nonstandard interpretation indicated above. One approach is to represent tangent-bundle pairs $(x,\overline{x})$ (henceforth simply bundles) as objects and overload the arithmetic primitives to manipulate such objects. The other is to transform the source code, replacing each real variable x with a pair of real variables x and $\overline{x}$ and augmenting the source code with expressions and statements to compute the $\overline{x}$ values.

These two approaches exhibit complementary tradeoffs. The overloading approach, particularly when it allows arithmetic operations to apply to either numbers or bundles, supports a callee derives programming style. A function optimizer can be written as a higher-order function, taking an objective function as its argument. The optimizer can invoke the objective function with a bundle to compute its derivative and perform gradient-based optimization, without knowledge of the caller. In contrast, the transformation approach requires a caller derives programming style. The optimizer takes two function arguments, the objective function and its derivative, and the caller must arrange for the build system to transform the code for the objective function into code for its derivative. The overloading approach thus supports a greater level of modularity, allowing one to build a hierarchal library of mathematical functionality where the need for derivatives is kept internal to that library, hidden from the user. The transformation approach requires exposing the need for derivatives all the way up the signatures of functions in that hierarchal library.

The overloading approach exhibits another advantage. When implemented correctly, one can take derivatives of functions that in turn take derivatives of other functions. We illustrate the utility of doing so in Subsection 5-7. This involves computing higher-order derivatives. A properly implemented overloading approach can compute derivatives of arbitrary order, even when the requisite order is not explicitly specified and only implicit in the control-flow of the program. When implemented correctly, the transformation approach can also transform transformed code to compute higher-order derivatives. The difference is that, since the transformation is typically done by a preprocessor, the preprocessor must be explicitly told which higher-order derivatives are needed.

In contrast, the overloading approach exhibits a computational cost that is not exhibited by the transformation approach. Unless specifically optimized, bundles must be allocated at run time, accessing the components of bundles requires indirection, and overloaded arithmetic is not inlined and requires run-time dispatch and perhaps even indirect function calls. The transformation approach, however, can yield FORTRAN-like code without these run-time costs and has thus become the method of choice in the scientific and engineering communities where the speed of numerical code is of paramount importance.

In this section we present a novel approach that attains the advantages of both the overloading and transformation approaches. We present a novel functional-programming language, VLAD, that contains mechanisms for transforming code into new code that computes derivatives. These mechanisms apply to the source code that is, at least conceptually, part of closures. Conceptually, at least, such transformation happens at run time. The availability of such transformation mechanisms at run time supports a callee derives programming style where the callee invokes the transformation mechanisms on closures provided by the caller. Again, conceptually at least, the availability of run-time transformation mechanisms eliminates the preprocessor and allows a program to compute derivatives whose order depends on run-time control-flow. A novel aspect of this system is the application of polyvariant flow analysis to perform the requisite transformations at compile time instead of run time. The remainder of this paper describes the VLAD language, including the code-transformation mechanisms, describes the polyvariant flow-analysis and code-generation techniques we have developed for the STALIN$\nabla$ compiler for VLAD, and illustrates the ability of these techniques to generate FORTRAN-like target code from VLAD source code.

2-3 Overview

Given the formulation from the previous section, evaluation of (fx) under the nonstandard interpretation implied by forward AD requires two things. First, one must transform $f$ so that it operates on bundles instead of reals. We introduce the function j* to accomplish this. Second, one must bundle x with a tangent. We introduce the function bundle to accomplish this. When computing simple derivatives, the tangent of the independent variable is one. Thus is accomplished by evaluating the expression ((j*$f$) (bundle x 1)). This yields a bundle containing the value of $f(x)$ with its derivative $f'(x)$. We introduce the functions primal and tangent to extract these components. With these, the derivative operator for functions $\mathbb{R} \to \mathbb{R}$ can be formulated as a higher-order function:

(define (derivative f)
  (lambda (x)
    (tangent ((j* f) (bundle x 1)))))

Several complications arise. The function f may call other functions, directly or indirectly, and all of these may call primitives. All of these need to be transformed. We assume that primitives are not inlined (at least conceptually) and that every function or primitive that is called is reachable as a (possibly nested) value of a free variable closed over by $f$. As closures are usually opaque, a reflective mechanism is needed to access such values. Thus j* is formulated using the conceptual framework of map-closure.

Primitives don't have closures. Thus j* must know how to transform each primitive into an appropriate function, usually implemented as a closure.

The functions reachable from $f$ that j* needs to transform might not be the direct values of the free variables closed over by $f$. The may be nested in aggregate data which includes the closure slots of other functions. Thus the machinery of map-closure must be applied recursively and combined with machinery to traverse other non-opaque aggregates.

We assume that all constants accessed by $f$ are represented as values of free variables closed over by $f$ (i.e., constant conversion). These, along with other closed-over variables (that are treated as constants for the purpose of computing derivatives) must have all (potentially nested) reals bundled with zero. Thus j* conceptually incorporates the mechanism of bundle.

Similarly, the input data x might be aggregate. With such, partial derivatives can be computed by taking one real component to be the independent variable, and thus bundled with one, and the other real components to be constants, and thus bundled with zero. Alternatively, directional derivatives can be computed by bundling the real components of x with the corresponding components of the direction vector. Thus we generalize bundle to take aggregate data paired with an aggregate tangent containing the direction-vector components. It is necessary to have the primal and tangent arguments to bundle have the same shape. Thus when the primal argument contains discrete values, we fill the corresponding components of the tangent argument with the same values as the primal argument. We justify this in section 4.1.

Just as the input data might be aggregate, the result of a function might also be aggregate. Accordingly, we generalize primal and tangent to take arbitrary aggregate data that contains (possibly nested) bundles as arguments and traverse such data to yield result data of the same shape containing only the primal or tangent components of these (possibly nested) bundles. Such aggregate data may contain opaque closures. So that primal and tangent can traverse these closures, they too are formulated with the machinery of map-closure.

The aggregate value x may contain closures (which get called by $f$). Thus these (and all functions and closed-over reals that they can access) also need to be transformed. Thus bundle conceptually incorporates the mechanism of j*. The mechanism of j* conceptually is the same as bundling all closed-over values with zero. However, since some of those closed-over values may be (and usually are) opaque closures, there is no way for a user to construct an appropriate closure as a tangent value whose slots are zero. Thus we introduce the function zero that maps an arbitrary data structure x, possibly containing possibly nested closures, to a tangent value of the same shape with zero tangent values in all slots that correspond to those in x that contain reals. Since zero may need to traverse opaque closures, it too is formulated with the machinery of map-closure.

With this, j* can be defined as:
(define (j* x) (bundle x (zero x)))
so long as bundle transforms primitives. With this, primal and tangent must know how to perform the inverse transformation from transformed primitives back to the corresponding original primitives.

2-4 VLAD: A Functional Language for AD

VLAD is a simple higher-order functional-programming language designed to support AD. It resembles SCHEME, differing in the following respects:

The only SCHEME data types supported are the empty list, Booleans, reals, pairs, and procedures.

Only a subset of the builtin SCHEME procedures and syntax are supported.

Rest arguments are not supported

The construct cons is builtin syntax.

The construct list is a macro:
(list) ⇝ ( )
(list $e_1$ $e_2$ ... ) ⇝ (cons $e_1$ (list $e_2$ ... ))

Procedure parameters p can be variables, '( ) to indicate an argument that is ignored, or (cons $p_1 p_2$) to indicate the appropriate destructing.

All procedures take exactly one argument and return exactly one result. This is accomplished in part by the basis, in part by the following transformations:
($e_1$) ⇝ ($e_1$ '( ))
($e_1$ $e_2$ $e_3$ $e_4$ ... ) ⇝ ($e_1$ (cons* $e_2$ $e_3$ $e_4$ ... ))
(lambda ( ) e) ⇝ (lambda ((cons*)) e)
(lambda ($p_1$ $p_2$ $p_3$ ... ) e)
  ⇝ (lambda ((cons* $p_1$ $p_2$ $p_3$ ... )) e)

together with a cons* macro:
(cons*) ⇝ ( )
(cons* $e_1$) ⇝ $e_1$
(cons* $e_1$ $e_2$ $e_3$ ... ) ⇝ (cons $e_1$ (cons* $e_2$ $e_3$ ... ))

and by allowing list and cons* as parameters.

The above, together with the standard SCHEME macro expansions, a macro for if:
(if $e_1$ $e_2$ $e_3$) ⇝
  (if-procedure $e_1$ (lambda ( ) $e_2$) (lambda ( ) $e_3$))

and conversion of constants into references to variables bound in a top-level basis environment (i.e., constant conversion) suffice to transform any program into the following core language:

e ::= x |(lambda (x) e)|($e_1$ $e_2$)
  |(letrec (($x_1$ $e_1$) ... ($x_n$ $e_n$)) e)|(cons $e_1$ $e_2$)

We often abbreviate (lambda (x) e) as $\lambda x\, e$, ($e_1$ $e_2$) as $e_1\, e_2$, and (cons $e_1$ $e_2$) as $e_1, e_2$. For expository purposes, we omit discussion of letrec for the remainder of this section.

We use x to denote variables, e to denote expressions, and v to denote VLAD values. Values are either scalar or aggregate. Scalars are either discrete, such as the empty list, booleans, or primitive procedures (henceforth primitives), or continuous, i.e., reals. Aggregate values are either closures ($\sigma$, e) or pairs $v_1$, $v_2$, where $\sigma$ is an environment, a (partial) map from variables to values, represented extensionally as a set of bindings x↦v. Pairs are constructed by the core syntax $e_1$, $e_2$ and the components of pairs can be accessed by the primitives car and cdr.

2-4.1 The Forward AD Basis

We augment the space of aggregate values to include bundles denoted as $v_1 \triangleright v_2$. We refer to the first component of a bundle as the primal value and the second component of a bundle as the tangent value. Unlike pairs, which can contain arbitrary values as components, bundles are constrained so that the tangent is a member of the tangent space of the primal. We will define the tangent space momentarily. We augment the basis with the primitive bundle to construct bundles, the primitives primal and tangent to access the components of bundles, and the primitive zero to construct zero elements of the tangent spaces.

We denote an element of the tangent space of a value $v$ as $\overline{v}$ and an element of the bundle space of a value $v$, i.e., the space of bundles $v \overline{v}, \triangleright$ as $\overleftrightarrow{v}$. We will formally define the tangent and bundle spaces momentarily. We first give the informal intuition.

Defining the tangent and bundle spaces for reals is straightforward. The tangent of a real is a real and the bundle of a real with its real tangent is a pair thereof. We use $v_1 \triangleright v_2$ instead of $(\upsilon_1, \upsilon_2)$ to distinguish bundles from pairs created by cons. The definition of tangent and bundle spaces becomes more involved for other types of data. Conceptually, at least, we can take the bundle space of any value $\upsilon_1$ to be the space of bundles $\upsilon_1 \triangleright \upsilon_2$ where $\upsilon_2$ is a member of an appropriate tangent space of $\upsilon_1$. For now, let us take the tangent of a pair to also be a pair. (We will justify this momentarily.) With this, we can take the bundle space of a pair $(\upsilon_1, \upsilon_2)$ to be $((\upsilon_1, \upsilon_2) \triangleright (\upsilon_3, \upsilon_4))$. Alternatively, we can interleave the components of the tangent with the components of the primal: $((\upsilon_1 \triangleright \upsilon_3), (\upsilon_2 \triangleright \upsilon_4))$ The former has the advantage that extracting the primal and tangent is simple but the disadvantage that extracting the car and cdr requires traversing the data structure. The latter has complementary tradeoffs.

Conceptually, at least, we can use either representation for the bundle space of closures. However, the interleaved representation has an advantage: it is also a closure:

$(\{x_1 \mapsto (\upsilon_1 \triangleright \upsilon'_1), \ldots, x_n \mapsto (\upsilon_n \triangleright \upsilon'_n)\}, e)$ and thus can be invoked by the same evaluation mechanism as ordinary closures for primal values. The non-interleaved representation, however, is not a closure:

$(\{x_1 \mapsto \upsilon_1, \ldots, x_n \mapsto \upsilon_n\}, e) \triangleright (\ldots, \upsilon'_1, \ldots, \upsilon'_n, \ldots)$ It is a primal closure bundled with an element of the tangent space of that closure, whatever that is, and would require a novel evaluation mechanism. This motivates using the interleaved representation, at least for closures.

Conceptually, at least, the above issue affects only closures. One could adopt either representation for other aggregate data. However, we wish our programs to exhibit another desirable property. In the absence of AD, the semantics of a program is unchanged when one replaces a builtin aggregate data type, like pairs, with an encoding as closures, like that of Church or Scott. This implies, that conceptually at least, all aggregate data must use the interleaved representation.

This creates an ambiguity: does $((\upsilon_1 \triangleright \upsilon_3), (\upsilon_2 \triangleright \upsilon_4))$ represent a pair of two bundles $(\upsilon_1 \triangleright \upsilon_3)$ and $(\upsilon_2 \triangleright \upsilon_4)$ or a bundle of two pairs $(v1, v2)$ and $(v3, v4)$ (that has been interleaved)? To resolve this ambiguity, we introduce the notion of a 'bundled' pair $(v_1 \overset{\rightarrow}{\div} v_2).$ We augment our core syntax with expressions $e_1 \overset{\rightarrow}{\div} e_2$ to construct bundles pairs. Note that we must support the ability to represent and construct multiply bundled pairs $(v_1 \overset{\rightarrow}{\div} v_2), (v_1 \overset{\rightarrow\rightarrow}{\div} v_2), \ldots.$ A similar ambiguity arises for closures: does
$(\{x_1 \mapsto (\upsilon_1 \triangleright \upsilon'_1), \ldots, x_n \mapsto (\upsilon_n \triangleright \upsilon'_n)\}, \lambda x\, e)$
represent a primal closure that happens to close over bundle values or a bundled closure? To resolve this ambiguity, we adopt a tagging scheme $\overrightarrow{x}$ for variables x to indicate that they contain bundles. The above would indicate a primal closure (that happens to close over bundle values) while:

$(\{\overrightarrow{x_1} \mapsto (\upsilon_1 \triangleright \upsilon'_1), \ldots, \overrightarrow{x_n} \mapsto (\upsilon_n \triangleright \upsilon'_n)\}, \lambda \overrightarrow{x}\, \overrightarrow{e})$ would indicate a bundled closure. We transform the bodies e of the lambda expressions associated with closures to access the suitably tagged variables and also to construct suitably bundled pairs.

The question then arises: what form should the tangent space of aggregate data take? The tangent of a piece of aggregate data must contain the same number of reals as the corresponding primal. Conceptually, at least, one might consider representing the tangent of one object with an object of a different type or shape, e.g., taking the tangent of a closure to be constructed out of pairs. However, one can show that any function f that only rearranges a data structure containing reals to a different data structure containing reals, without performing any operations on such reals, must exhibit the following property:

$((j^* f)\, x) = (\text{bundle}\, (f\, (\text{primal}\, x))\, (f\, (\text{tangent}\, x)))$ Since $f$ must perform the same rearrangement on both the primal and the tangent, it must be insensitive to its type or shape. As VLAD functions can be sensitive to their argument's type or shape, this implies that the tangent of an aggregate object must be of the same type and shape as the corresponding primal. This further implies that the tangent of a discrete object such as the empty list, a boolean, or a primitive, must be the same as that object.

We now formalize the above intuition. We introduce a mechanism for creating a new variable $\overrightarrow{x}$ that corresponds to an existing variable x (which may in turn be such a newly created variable). The variable $\overrightarrow{x}$ must be distinct from any existing variable including x. Any variable $\overrightarrow{x}$ will contain an element of the bundle space of the corresponding variable x. Our AD transformations rely on a bijection between the space of variables x and the space of variables $\overrightarrow{x}$.

We introduce the following transformation between the space of expressions e that manipulate primal values to the space of expressions $\overrightarrow{x}$ that manipulate bundle values:

$\overrightarrow{\lambda x\, e} \leadsto \lambda \overrightarrow{x}\, \overrightarrow{e}$ $\overrightarrow{e_1\, e_2} \leadsto \overrightarrow{e_1}\, \overrightarrow{e_2}$ $\overrightarrow{e_1, e_2} \leadsto \overrightarrow{e_1} \overset{\rightarrow}{\div} \overrightarrow{e_2}$ We require this to be a bijection since bundle will map e to $\overrightarrow{x}$ and primal and tangent will map $\overrightarrow{x}$ back to e. Note that the code $\overrightarrow{x}$ is largely the same as the code e except for two differences. First, the variable binders and accesses have been mapped from x to $\overrightarrow{x}$. This is simply α conversion. Second, the cons expressions $e_1, e_2$ are mapped to $\overrightarrow{e_1} \overset{\rightarrow}{\div} \overrightarrow{e_2}$ where $\overrightarrow{x}$ denotes a new kind of expression that constructs bundled pairs.

We now can formally define the tangent space of VLAD values:

$\overrightarrow{\upsilon} = \upsilon$ when $\upsilon$ is a discrete scalar $\overrightarrow{\upsilon} \in \mathbb{R}$ when $\upsilon \in \mathbb{R}$ -continued $$\overline{\langle\{x_1 \mapsto v_1, \ldots, x_n \mapsto v_n\}, \lambda x\ e\rangle} = \langle\{x_1 \mapsto \overrightarrow{v_1}, \ldots, x_n \mapsto \overrightarrow{v_n}\}, \lambda x\ e\rangle$$

$$\overline{v \triangleright \vec{v}} = \vec{v} \triangleright \vec{\vec{v}}$$

$$\overline{v_1, v_2} = \overrightarrow{v_1}, \overrightarrow{v_2}$$

and the corresponding bundle space:

$$\vec{v} = v \triangleright \vec{v} \text{ when } v \text{ is a non-primitive scalar}$$

$$\vec{v} = \langle\sigma, \lambda\vec{x}(\text{bundle}((v(\text{primal } \vec{x})),$$
$$(*((v^{(1)})(\text{primal } \vec{x})),$$
$$(\text{tangent } \vec{x}))))\rangle$$

when $v$ is a primitive $\mathbb{R} \to \mathbb{R}$ $$\vec{v} = \langle\sigma, \lambda\vec{x}(\text{bundle}((v(\text{primal } \vec{x})),$$
$$(+((*((v^{(1,0)}(\text{primal}\vec{x})),$$
$$(\text{car}(\text{tangent } \vec{x})))),$$
$$(*((v^{(0,1)}(\text{primal } \vec{x})),$$
$$(\text{cdr}(\text{tangent } \vec{x}))))))\rangle$$

when $v$ is a primitive $\mathbb{R} \times \mathbb{R} \to \mathbb{R}$ $$\vec{v} = \langle\sigma, \lambda\vec{x}(j*(v(\text{primal } \vec{x})))\rangle$$

when $v$ is a primitive predicate $$\overline{\langle\{x_1 \mapsto v_1, \ldots, x_n \mapsto v_n\}, \lambda x\ e\rangle} = \langle\{\vec{x_1} \mapsto \vec{v_1}, \ldots, \vec{x_n} \mapsto \vec{v_n}\}, \overrightarrow{\lambda x\ e}\rangle$$

$$\overline{v \triangleright \vec{v}} = \vec{v} \triangleright \vec{\vec{v}}$$

$$\overline{v_1, v_2} = \vec{v_1}, \vec{v_2}$$

In the above, we use $v^{(1)}$ to denote the derivative of $v$, and $v^{(1,0)}$ and $v^{(0,1)}$ to denote the partial derivatives of $v$ with respect to its first and second arguments. A finite number of such explicit derivatives are needed for the finite set of primitives. We only show how to transform arithmetic primitives. Transformations of other primitives, such as if if-procedure, car, and cdr, as well as the AD primitives bundle, primal, tangent, and zero themselves, follow from the earlier observation about functions that only rearrange aggregate data. Also note that the environment σ in the closures created for transformed primitives must map all of the free variables to their values in the top-level environment. This includes $v$ itself, as well as
primal, tangent, bundle, j*, car, cdr, +, *, and anything need to implement $v^{(1)}$, $v^{(1,0)}$ and $v^{(0,1)}$.

We now can give formal definitions of the AD primitives. The primitive bundle is defined as follows:

$$\text{bundle } v, \vec{v} \overset{\Delta}{=} v \triangleright \vec{v} \text{ when } v \text{ is a non-primitive scalar}$$

$$\text{bundle } v, \vec{v} \overset{\Delta}{=} \vec{v} \text{ when } v \text{ is a primitive}$$

$$\text{bundle}\langle\{x_1 \mapsto v_1, \ldots, x_n \mapsto v_n\}, \lambda x\ e\rangle,$$
$$\overline{\langle\{x_1 \mapsto v_1, \ldots, x_n \mapsto v_n\}, \lambda x\ e\rangle} \overset{\Delta}{=} \langle\{\vec{x_1} \mapsto (\text{bundle}v_1, \overrightarrow{v_1}), \ldots, \vec{x_n} \mapsto (\text{bundle } v_n, \overrightarrow{v_n})\}, \overrightarrow{\lambda x\ e}\rangle$$

$$\text{bundle}(v \triangleright \vec{v}), \overline{(v \triangleright \vec{v})} \overset{\Delta}{=} (\text{bundle } v, \vec{v}) \triangleright (\text{bundle } \vec{v}, \vec{\vec{v}})$$

$$\text{bundle } (v_1, v_2), \overline{(v_1, v_2)} \overset{\Delta}{=} (\text{bundle } v_1, \overrightarrow{v_1}), (\text{bundle } v_2, \overrightarrow{v_2})$$

The primitive primal is defined as follows:

$$\text{primal } \vec{v} \overset{\Delta}{=} v \text{ when } v \text{ is primitive}$$

$$\text{primal } \overline{\langle\{x_1 \mapsto v_1, \ldots, x_n \mapsto v_n\}, \lambda x e\rangle} \overset{\Delta}{=}$$
$$\langle\{x_1 \mapsto (\text{primal } \overrightarrow{v_1}), \ldots, x_n \mapsto (\text{primal } \overrightarrow{v_n})\}, \lambda x e\rangle$$

$$\text{primal } (v \triangleright \vec{v}) \overset{\Delta}{=} v$$

$$\text{primal } (\overrightarrow{v_1}, \overrightarrow{v_2}) \overset{\Delta}{=} (\text{primal } \overrightarrow{v_1}), (\text{primal } \overrightarrow{v_2})$$

The primitive tangent is defined as follows:

$$\text{tangent } \vec{v} \overset{\Delta}{=} \vec{v} \text{ when } v \text{ is primitive}$$

$$\text{tangent } \overline{\langle\{x_1 \mapsto v_1, \ldots, x_n \mapsto v_2\}, \lambda x e\rangle} \overset{\Delta}{=}$$
$$\langle\{x_1 \mapsto (\text{tangent } \overrightarrow{v_1}), \ldots, x_n \mapsto (\text{tangent } \overrightarrow{v_n})\}, \lambda x e\rangle$$

$$\text{tangent } (v \triangleright \vec{v}) \overset{\Delta}{=} \vec{v}$$

$$\text{tangent } (\overrightarrow{v_1}, \overrightarrow{v_2}) \overset{\Delta}{=} (\text{tangent } \overrightarrow{v_1}), (\text{tangent } \overrightarrow{v_2})$$

And the primitive zero is defined as follows:

$$\text{zero } v \overset{\Delta}{=} \vec{v} \text{ when } v \text{ is a discrete scalar}$$

$$\text{zero } v \overset{\Delta}{=} \vec{0} \text{ when } v \in \mathbb{R}$$

$$\text{zero}\langle\{x_1 \mapsto v_1, \ldots, x_n \mapsto v_n\}, \lambda x e\rangle \overset{\Delta}{=}$$
$$\langle\{x_1 \mapsto (\text{zero } v_1), \ldots, x_n \mapsto (\text{zero } v_n)\}, \lambda x e\rangle$$

$$\text{zero } (v \triangleright \vec{v}) \overset{\Delta}{=} (\text{zero } v) \triangleright (\text{zero } \vec{v})$$

$$\text{zero } (v_1, v_2) \overset{\Delta}{=} (\text{zero } v_1), (\text{zero } v_2)$$

Note the reflection on closure environments that occurs in all four of the above primitives. Also note the reflective transformation that is performed on the closure expressions. While the former falls within the conceptual framework of map-closure, the latter transcends that framework.

2-5 Flow Analysis

STALIN∇ performs a polyvariant union-free flow analysis using a formulation based on abstract interpretation. For expository purposes, in the following overview, we omit many details and, at times, give a simplified presentation that differs in technicalities, but not in spirit, from the actual implementation. Inter alia, we omit discussion of letrec, bundled pairs, and primitives.

2-5.1 Concrete Values and Environments

A concrete value v is either a concrete scalar or a concrete aggregate. A concrete environment σ or is a (partial) map from variables to concrete values, represented extensionally as a set of bindings x ↦ v. Let $\mathbb{B}$ denote $\{\#t,\#f\}$. A concrete scalar is either ( ), a concrete boolean b∈$\mathbb{B}$, a concrete real r∈$\mathbb{R}$, or a concrete primitive p. A concrete aggregate is either a concrete closure (σ, e), a concrete bundle $v_1 \triangleright v_2$, or a concrete pair $(v_1, v_2)$. We assume that the concrete environment of a concrete closure maps precisely the free variables of the expression of that concrete closure. A concrete function is either a concrete primitive or a concrete closure. We use τ to refer to the set of all concrete values. We often omit the specifier 'concrete' when it is clear from context.

2-5.2 Concrete Equivalence

Our formulation of flow analysis requires notions of equivalence for expressions, concrete values, and concrete environments. Programming languages typically do not define equivalence for function values. We need such a notion of equivalence for flow analysis since abstract values and environments denote sets of concrete values and environments and flow analysis is formulated in terms of unions and intersections of such sets, and subset and equality relations between such sets, which in turn requires a notion of equivalence between the members of such sets.

Flow analysis typically formulates expression equivalence as equivalence between indices assigned to source-code expressions. This is suitable only in the traditional case where the source program is fixed and explicitly available, in its entirety, prior to the start of flow analysis. In our case, however, application of the AD primitives bundle, primal, and tangent creates new expressions via the transformation $\vec{e}$ (and its inverse), at least conceptually. Thus we instead use a structural notion of expression equivalence, because in VLAD some expressions are not explicitly available prior to the start of flow analysis and are created during the process of flow analysis.

Expression, value, and environment equivalence are mutual notions. Nominally, expression, environment, and function equivalence are extensional: two expressions are equivalent if they evaluate to equivalent values in equivalent environments, two environments are equivalent if they map equivalent variables to equivalent values, and two functions are equivalent if they yield equivalent result values when applied to equivalent argument values. Equivalence for other values is structural. The extensional notion of expression, environment, and function equivalence is undecidable. Thus we adopt the following conservative approximation. We take two expressions to be equivalent if they are structurally equivalent, take two environments to be equivalent if they map equivalent variables to equivalent values, take primitives to be equivalent only to themselves, and take two closures to be equivalent if they contain equivalent expressions and environments. While we do not currently do so, one can strengthen this approximation with a suitable notion of $\alpha$-equivalence.

2-5.3 Concrete Evaluation

We develop our abstract evaluator by modifying the following standard eval/apply concrete evaluator:

$$\mathcal{A}\langle\sigma, \lambda xe\rangle v_2 \triangleq \mathcal{E} e\sigma[x \mapsto v_2]$$

$$\mathcal{E} x\sigma \triangleq \sigma x$$

$$\mathcal{E}(\lambda xe)\sigma \triangleq \langle\sigma, \lambda xe\rangle$$

$$\mathcal{E}(e_1 e_2)\sigma \triangleq \mathcal{A}(\mathcal{E} e_1 \sigma)(\mathcal{E} e_2 \sigma)$$

$$\mathcal{E}(e_1, e_2)\sigma \triangleq (\mathcal{E} e_1 \sigma), (\mathcal{E} e_2 \sigma)$$

The above, however, does not enforce the constraint that the concrete environment of a concrete closure map precisely the free variables of the expression of that concrete closure. We can enforce this constraint, as well as the constraint that $\sigma$ map precisely the free variables in e in any call $e\epsilon\sigma$, by judiciously restricting the domains of concrete environments at various places in the above evaluator. So as not to obscure the presentation of our formulation, we omit such restriction operations both above and in similar situations for the remainder of the paper.

A concrete analysis a is a finite extensional partial representation of the concrete evaluator as a set of bindings $e \mapsto \sigma \mapsto \upsilon$. A concrete analysis $\alpha$ is sound if for every $(e \mapsto \sigma \mapsto \upsilon) \in \alpha$, $\upsilon = (\epsilon e\sigma)$.

2-5.4 Abstract Values and Environments

Most standard approaches to flow analysis take the space of abstract values to include unions. This is because they are typically applied to languages whose execution model supports tags and tag dispatching. Since we wish to compile code to a FORTRAN-like execution model that does not support tags and tag dispatching, our space of abstract values does not include unions.

Preclusion of unions further precludes recursive abstract values as such recursion could not terminate. As a consequence, all of our abstract values will correspond to data structures of fixed size and shape in the execution model. This allows our code generator to unbox all aggregate data.

An abstract value $\overline{\upsilon}$ is either an abstract scalar or an abstract aggregate. An abstract environment $\overline{\sigma}$ is a (partial) map from variables to abstract values, represented extensionally as a set of bindings $x \mapsto \overline{\upsilon}$. An abstract scalar is either a concrete scalar, an abstract boolean $\overline{\mathbb{B}}$, or an abstract real $\overline{\mathbb{R}}$. An abstract aggregate is either an abstract closure $(\overline{\sigma}, e)$, an abstract bundle $\overline{\upsilon}_1 \triangleright \overline{\upsilon}_2$, an abstract pair $(\overline{\upsilon}_1, \overline{\upsilon}_2)$, or an abstract top $\overline{\tau}$. We assume that the abstract environment of an abstract closure maps precisely the free variables of the expression of that abstract closure. An abstract function is either a concrete primitive or an abstract closure.

Abstract values and environments denote their extensions, sets of concrete values and environments:

$$EXT\, v = \{v\}$$

$$EXT\, \overline{\mathbb{B}} = \mathbb{B}$$

$$EXT\, \overline{\mathbb{R}} = \mathbb{R}$$

$$EXT\, \langle\overline{\sigma}, e\rangle = \bigcup_{\sigma \in (EXT\overline{\sigma})} \{\langle\sigma, e\rangle\}$$

$$EXT\, (\overline{v}_1 \triangleright \overline{v}_2) = \bigcup_{v_1 \in (EXT\overline{v}_1)} \bigcup_{v_2 \in (EXT\overline{v}_2)} \{v_1 \triangleright v_2\}$$

$$EXT\, (\overline{v}_1, \overline{v}_2) = \bigcup_{v_1 \in (EXT\overline{v}_1)} \bigcup_{v_2 \in (EXT\overline{v}_2)} \{(v_1, v_2)\}$$

$$EXT\, \overline{T} = T$$

$$EXT\{x_1 \mapsto \overline{v}_1, \ldots, x_n \mapsto \overline{v}_n\} = \bigcup_{v_1 \in (EXT\overline{v}_1)} \ldots \bigcup_{v_2 \in (EXT\overline{v}_2)} \{\{x_1 \mapsto v_1, \ldots, x_n \mapsto v_n\}\}$$

2-5.5 Abstract Subset, Equivalence, Union, and Intersection

Our formulation of flow analysis uses notions of subset and equivalence relations between abstract values and environments as well as unions and intersections of abstract values and environments. We take the subset and equivalence relations between two abstract values or two abstract environments to denote the corresponding relations between their extensions. These relations can be determined precisely:

$\upsilon \subset \upsilon$ $\overline{\upsilon} \subset \overline{\mathbb{B}}$ when $\overline{\upsilon} \in (\mathbb{B} \cup \{\overline{\mathbb{B}}\})$ $\overline{\upsilon} \subset \overline{\mathbb{R}}$ when $\overline{\upsilon} \in (\mathbb{R} \cup \{\overline{\mathbb{R}}\})$ $(\overline{\sigma}, e) \subset (\overline{\sigma}', e)$ when $\overline{\sigma} \subset \overline{\sigma}'$ $(\overline{\upsilon}_1 \triangleright \overline{\upsilon}_2) \subset (\overline{\upsilon}'_1 \triangleright \overline{\upsilon}'_2)$ when $(\overline{\upsilon}_1 \subset \overline{\upsilon}'_1) \wedge (\overline{\upsilon}_2 \subset \overline{\upsilon}'_2)$ $(\overline{\upsilon}_1, \overline{\upsilon}_2) \subset (\overline{\upsilon}'_1, \overline{\upsilon}'_2)$ when $(\overline{\upsilon}_1 \subset \overline{\upsilon}'_1) \wedge (\overline{\upsilon}_2 \subset \overline{\upsilon}'_2)$ $\overline{\upsilon} \subset \overline{\tau}$
$\{x_1 \mapsto \overline{\upsilon}_1, \ldots, x_n \mapsto \overline{\upsilon}_n\} \subset \{x_1 \mapsto \overline{\upsilon}'_1, \ldots, x_n \mapsto \overline{\upsilon}'_n\}$
when $(\overline{\upsilon}_1 \subset \overline{\upsilon}'_1) \wedge \ldots \wedge (\overline{\upsilon}_n \subset \overline{\upsilon}'_n)$
When $\overline{\upsilon} \subset \overline{\upsilon}'$ we say that $\overline{\upsilon}'$ is wider that $\overline{\upsilon}$.

We take the union of two abstract values or two abstract environments to denote the abstract value or the abstract environment whose extension is the union of the extensions of those two abstract values or two abstract environments. Such an abstract value or abstract environment may not exist. We compute a conservative approximation to this notion, widening the result if necessary:

$\upsilon \cup \upsilon \Rightarrow$
$b_1 \cup b_2 \Rightarrow \mathbb{B}$ when $b_1 \neq b_2$
$b \cup \mathbb{B} \Rightarrow \mathbb{B}$
$r_1 \cup r_2 \Rightarrow \mathbb{R}$ when $r_1 \neq r_2$
$r \cup \mathbb{R} \Rightarrow \mathbb{R}$
$(\overline{\sigma}, e) \cup (\overline{\sigma}', e) \Rightarrow \overline{\sigma} \cup \overline{\sigma}', e)$
$(\overline{\upsilon}_1 \triangleright \overline{\upsilon}_2) \cup (\overline{\upsilon}'_1 \triangleright \overline{\upsilon}'_2) \Rightarrow ((\overline{\upsilon}_1 \cup \overline{\upsilon}'_1) \triangleright (\overline{\upsilon}_2 \cup \overline{\upsilon}'_2))$
$(\overline{\upsilon}_1, \overline{\upsilon}_2) \cup (\overline{\upsilon}'_1, \overline{\upsilon}'_2) \Rightarrow ((\overline{\upsilon}_1 \cup \overline{\upsilon}'_1), (\overline{\upsilon}_2 \cup \overline{\upsilon}'_2))$
$\{x \mapsto \overline{\upsilon}_1, \ldots, x_n \mapsto \overline{\upsilon}_n\} \cup \{x_1 \mapsto \overline{\upsilon}'_1, \ldots, x_n \mapsto \overline{\upsilon}'_n\}$
$\Rightarrow \{x_1 \mapsto (\overline{\upsilon}_1 \cup \overline{\upsilon}'_1), \ldots, x_1 \mapsto (\overline{\upsilon}_n \cup \overline{\upsilon}'_n)\}$
otherwise return $\overline{\tau}$ We take the intersection of two abstract values or two abstract environments to denote the abstract value or the abstract environment whose extension is the intersection of the extensions of those two abstract values or two abstract environments. Such an abstract value or abstract environment may not exist. Our formulation of flow analysis has the property that we only compute such intersections when do they exist. We compute this notion of intersection precisely as follows:

$\overline{\upsilon} \cap \overline{\upsilon} \Rightarrow \overline{\upsilon}$
$b \cap \mathbb{B} \Rightarrow b$
$r \cap \mathbb{R} \Rightarrow r$
$(\overline{\sigma}, e) \cap (\overline{\sigma}', e) \Rightarrow \overline{\sigma} \cap \overline{\sigma}', e)$
$(\overline{\upsilon}_1 \triangleright \overline{\upsilon}_2) \cap (\overline{\upsilon}'_1 \triangleright \overline{\upsilon}'_2) \Rightarrow ((\overline{\upsilon}_1 \cap \overline{\upsilon}'_1) \triangleright (\overline{\upsilon}_2 \cap \overline{\upsilon}'_2))$
$(\overline{\upsilon}_1, \overline{\upsilon}_2) \cap (\overline{\upsilon}'_1, \overline{\upsilon}'_2) \Rightarrow ((\overline{\upsilon}_1 \cap \overline{\upsilon}'_1), (\overline{\upsilon}_2 \cap \overline{\upsilon}'_2))$
$\{x_1 \mapsto \overline{\upsilon}_1, \ldots, x_n \mapsto \overline{\upsilon}_n\} \cap \{x_1 \mapsto \overline{\upsilon}'_1, \ldots, x_n \mapsto \overline{\upsilon}'_n\}$
$\Rightarrow \{x_1 \mapsto (\overline{\upsilon}_1 \cap \overline{\upsilon}'_1), \ldots, x_n \mapsto (\overline{\upsilon}_n \cap \overline{\upsilon}'_n)\}$ 2-5.6 Abstract Evaluation An abstract analysis $\overline{\alpha}$ is a set of bindings $e \mapsto \overline{\sigma} \mapsto \overline{\upsilon}$. The extension of an abstract analysis $\overline{\alpha}$ is the following set of concrete analyses:

$$cf \left\{ \left\{ e \mapsto \sigma \mapsto v \middle| (\exists \overline{\sigma}, \overline{v}) \begin{pmatrix} ((e \mapsto \overline{\sigma} \mapsto \overline{v}) \in \overline{a}) \wedge \\ (\sigma \in (EXT\ \overline{\sigma})) \wedge \\ (v \in (EXT\ \overline{v})) \end{pmatrix} \right\} \middle| (\exists \overline{\sigma}, \overline{v}) \begin{pmatrix} ((e \mapsto \overline{\sigma} \mapsto \overline{v}) \in \overline{a}) \wedge \\ (\sigma \in (EXT\ \overline{\sigma})) \end{pmatrix} \right\}$$

where cf its denotes the set-theoretic choice function, the function that maps a set $s_1$ of sets to a set $s_2$ of all sets that contain one member from each member of $s_1$. An abstract analysis is sound if it contains a sound concrete analysis in its extension.

We need a notion of equivalence for abstract analyses to define the fixpoint of abstract interpretation. Nominally, two abstract analyses are equivalent if their extensions are equivalent. We conservatively approximate this by taking two bindings to be equivalent if their corresponding expressions, abstract environments, and abstract values are equivalent and take two abstract analyses to be equivalent if they contain equivalent bindings.

We compute an abstract analysis with the following abstract evaluator:

$$\mathcal{E}_1 e \overline{\sigma} \overline{a} \triangleq \bigcap_{\substack{(e \mapsto \overline{\sigma}' \mapsto \overline{v}) \in \overline{a} \\ \overline{\sigma} \subseteq \overline{\sigma}'}} \overline{v}$$

(Note that the above is the only place where the intersection of two abstract values is computed and the algorithm has the property that that intersection exists.)

$$\mathcal{A}\langle \overline{\sigma}, \lambda xe \rangle \overline{v}_2 \overline{a} \triangleq \begin{cases} \mathcal{E}_1 e \overline{\sigma}[x \mapsto \overline{v}_2] \overline{a} & \text{when } \overline{v}_2 \neq \overline{T} \\ \overline{T} & \text{otherwise} \end{cases}$$

$$\mathcal{A} \overline{T} \overline{v}_2 \overline{a} \triangleq \overline{T}$$

$$\mathcal{E} x \overline{\sigma} \overline{a} \triangleq \overline{\sigma} x$$

$$\mathcal{E}(\lambda xe) \overline{\sigma} \overline{a} \triangleq \langle \overline{\sigma}, \lambda xe \rangle$$

$$\mathcal{E}(e_1 e_2) \overline{\sigma} \overline{a} \triangleq \mathcal{A}(\mathcal{E}_1 e_1 \overline{\sigma} \overline{a})(\mathcal{E}_1 e_2 \overline{\sigma} \overline{a}) \overline{a}$$

$$\mathcal{E}(e_1, e_2) \overline{\sigma} \overline{a} \triangleq \begin{cases} (\mathcal{E}_1 e_1 \overline{\sigma} \overline{a}), (\mathcal{E}_1 e_2 \overline{\sigma} \overline{a}) \\ \text{when } ((\mathcal{E}_1 e_1 \overline{\sigma} \overline{a}) \neq \overline{T}) \\ \wedge ((\mathcal{E}_1 e_2 \overline{\sigma} \overline{a}) \neq \overline{T}) \\ \overline{T} \quad \text{otherwise} \end{cases}$$

$$\mathcal{E}'_1 e \overline{\sigma} \overline{a} \triangleq \begin{cases} \{e \mapsto \overline{\sigma} \mapsto \overline{T}\} & \text{when } \neg (\exists \overline{v})(e \mapsto \overline{\sigma} \mapsto \overline{v}) \in \overline{a} \\ \{\} & \text{otherwise} \end{cases}$$

$$\mathcal{A}'\langle \overline{\sigma}, \lambda xe \rangle \overline{v}_2 \overline{a} \triangleq \begin{cases} \mathcal{E}'_1 e \overline{\sigma}[x \mapsto \overline{v}_2] \overline{a} & \text{when } \overline{v}_2 \neq \overline{T} \\ \{\} & \text{otherwise} \end{cases}$$

$$\mathcal{A}' \overline{T} \overline{v}_2 \overline{a} \triangleq \{\}$$

$$\mathcal{E}' x \overline{\sigma} \overline{a} \triangleq \{\}$$

$$\mathcal{E}'(\lambda xe) \overline{\sigma} \overline{a} \triangleq \{\}$$

$$\mathcal{E}'(e_1 e_2) \overline{\sigma} \overline{a} \triangleq (\mathcal{E}'_1 e_1 \overline{\sigma} \overline{a}) \cup (\mathcal{E}'_1 e_2 \overline{\sigma} \overline{a}) \\ \bigcup (\mathcal{A}'(\mathcal{E}_1 e_1 \overline{\sigma} \overline{a})(\mathcal{E}_1 e_2 \overline{\sigma} \overline{a}) \overline{a})$$

$$\mathcal{E}'(e_1, e_2) \overline{\sigma} \overline{a} \triangleq (\mathcal{E}'_1 e_1 \overline{\sigma} \overline{a}) \cup (\mathcal{E}'_1 e_2 \overline{\sigma} \overline{a})$$

$$\mathcal{U} \overline{a} \triangleq \bigcup_{(e \mapsto \overline{\sigma} \mapsto \overline{v}) \in \overline{a}} \{e \mapsto \overline{\sigma} \mapsto (\mathcal{E} e \overline{\sigma} \overline{a})\} \cup (\mathcal{E}' e \overline{\sigma} \overline{a})$$

We then compute $\overline{a}^* = u^* \overline{\alpha}_0$, where $\overline{\alpha}_0 = \{e_0 \mapsto \sigma_0 \mapsto \overline{\tau}\}$ is the initial abstract analysis, $e_0$ is the program, $\sigma_0$ is the basis, containing inter alia any bindings produced by constant conversion, and $u^*$ is the least fixpoint of $u$. The above flow-analysis procedure might not terminate, i.e., the least fixpoint might not exist. It is easy to see that the initial abstract analysis is sound and that u preserves soundness. Thus by induction, $\overline{\alpha}^*$ is sound when it exists. The algorithm has the property that $\overline{\tau}$ will never appear as the target of an abstract environment binding or as a slot of an abstract aggregate value. The only place in an abstract analysis that $\overline{\tau}$ can appear is as the target of a binding, e.g., $e \mapsto \overline{\sigma} \mapsto \overline{\tau}$. Our code generator only handles abstract analyses where $(\overline{\epsilon}_1 e \overline{\sigma} \overline{\alpha}^*) \neq \overline{\tau}$ for all e and $\sigma$ that would occur as arguments to $\epsilon$ during a concrete evaluation ($\epsilon e_0 \sigma_0$). We abort the compilation if this condition is violated. This can only occur when the union of two abstract values yields $\overline{\tau}$. The only place where the union of two abstract values is computed is between the results of the consequent and alternate of if-procedure.

2-5.7 Imprecision Introduction

The above flow-analysis procedure yields a concrete analysis for any program $e_0$ that terminates. This is equivalent to running the program during flow analysis. To produce a non-concrete analysis, we add a primitive real to the basis that behaves like the identity function on reals during execution but yields $\overline{\mathbb{R}}$ during flow analysis. In the examples in Subsection 5-7, we judiciously annotate our code with a small number of calls to real around constants, so that the programs perform all of the same floating-point computation as the variants in other languages, but leave certain constants as concrete values so that flow analysis terminates and satisfies the non-$\overline{\tau}$ condition discussed above.

2-6 Code Generation

The STALIN∇ code generator generates FORTRAN-like C code given an abstract analysis produced by polyvariant union-free flow analysis. In such an analysis, every application targets either a known primitive or a known lambda expression, potentially one created by flow-analysis-time source-code transformation induced by application of AD primitives. Recent versions of GCC will compile this C code to machine code similar to that generated by good FORTRAN compilers, given aggressive inlining, mediated by 'always inline' directives produced by our code generator, and scalar replacement of aggregates, enabled with the command-line option --param sra-field-structure-ratio=0. For expository purposes, in the following overview, we omit many details and, at times, give a simplified presentation that differs in technicalities, but not in spirit, from the actual implementation. Inter alia, we omit discussion of letrec, bundled pairs, and primitives.

Our code generator produces C code that is structurally isomorphic to the VLAD code. There is a C function for each specialized VLAD function, both closures and primitives. There is a function call in the C code for each application in each specialized closure expression. There are calls to constructor functions in the C code for each lambda expression and cons expression in each specialized closure expression. And there is C code that corresponds to each variable access in each specialized closure expression. The aggregate data is isomorphic as well. There is a C struct for each specialized aggregate data type in the VLAD code, including closures, and a slot in that C struct for each corresponding slot in the VLAD object. (We adopt a flat closure representation. Note that in the absence of mutation and eq?, as is the case for VLAD, all closure representations are extensionally equivalent and reduce to flat closures by unboxing.) One deviation from the above is that void structs, struct slots, arguments, and expressions are eliminated, as well as functions that return void results. The efficiency of the code generated results from polyvariant specialization, the union-free analysis, unboxing of all aggregate data, and aggressive inlining. One could imagine variants of our approach that employ selective unboxing and inlining.

We assume a map $\chi$ from alpha-converted VLAD variables to unique C identifiers, a map $S$ from abstract values to unique C identifiers, and a map $F$ from pairs of abstract values to unique C identifiers.

An abstract value is void when it does not contain any (nested) $\overline{\mathbb{B}}$ or $\overline{\mathbb{R}}$ values. Our code generator adopts the following map from non-void abstract values to C specifiers:

$$\mathcal{T}\overline{v} \triangleq \begin{cases} \text{int} & \text{when } \overline{v} = \overline{\mathbb{B}} \\ \text{double} & \text{when } \overline{v} = \overline{\mathbb{R}} \\ \text{struct } (S\overline{v}) & \\ \text{where struct } si \begin{cases} (\mathcal{T}\overline{v}_1)(\mathcal{X} x_1); \\ \ldots ; \\ (\mathcal{T}\overline{v}_n)(\mathcal{X} x_n); \end{cases}; \\ \text{when } \overline{v} = \langle \{x_1 \mapsto \overline{v}_1, \ldots, x_n \mapsto \overline{v}_n\}, e \rangle \\ \text{where struct } (S\overline{v})\{(\mathcal{T}\overline{v}_1)p; (\mathcal{T}\overline{v}_2)r;\}; \\ \text{when } \overline{v} = (\overline{v}_1 \triangleright \overline{v}_2) \\ \text{where struct } (S\overline{v})\{(\mathcal{T}\overline{v}_1)a; (\mathcal{T}\overline{v}_2)d;\}; \\ \text{when } \overline{v} = (\overline{v}_1, \overline{v}_2) \end{cases}$$

eliminating void struct slots. We also generate C constructor functions ($M\overline{v}$) of the appropriate arity for each non-void abstract aggregate value $\overline{v}$.

Our code generator adopts the following map from VLAD expressions e that evaluate to non-void abstract values in the abstract environment $\overline{\sigma}$ to C expressions:

$$\mathcal{C}x\overline{\sigma} \triangleq \begin{cases} (\mathcal{X} x) & \text{when } x \text{ is bound} \\ c.(\mathcal{X} x) & \text{when } x \text{ is free} \end{cases}$$

$$\mathcal{C}(\lambda xe)\overline{\sigma} \triangleq \begin{array}{l} \text{a call to } (\mathcal{M}(\overline{\mathcal{E}}_1(\lambda xe)\overline{\sigma}\overline{a}^*)) \text{ with} \\ \text{arguments that have the form of variable} \\ \text{accesses} \end{array}$$

$$\mathcal{C}(e_1 e_2)\overline{\sigma} \triangleq (\mathcal{F}(\overline{\mathcal{E}}_1 e_1 \overline{\sigma}\overline{a}^*)(\overline{\mathcal{E}}_1 e_2 \overline{\sigma}\overline{a}^*))((\mathcal{C} e_1 \overline{\sigma}), (\mathcal{C} e_2 \overline{\sigma}))$$

$$\mathcal{C}(e_1 e_2)\overline{\sigma} \triangleq (\mathcal{M}((\overline{\mathcal{E}}_1 e_1 \overline{\sigma}\overline{a}^*)(\overline{\mathcal{E}}_1 e_2 \overline{\sigma}\overline{a}^*)))((\mathcal{C} e_1 \overline{\sigma}), (\mathcal{C} e_2 \overline{\sigma}))$$

eliminating void arguments.

Our code generator generates distinct C functions for each abstract closure $(\overline{\sigma}, \lambda x\, e)$ that yields a non-void abstract value when called on each abstract value $\overline{v}$:

$(T(\overline{A}(\overline{\sigma}, \lambda x\, e)\overline{v}\overline{\alpha}^*)$
$(F(\overline{\sigma},\lambda x\, e)\overline{v})((T(\overline{\sigma}, \lambda e\, e))c, (T\overline{v})(\chi\, x))$
$\{\text{return } (\mathcal{C}\overline{\sigma}[x \mapsto \overline{v}]e);\}$ eliminating void parameters. Finally, we generate a C main function:

int main(void){(C $e_0$ $\overline{\sigma}_0$); return 0;}

For expository purposes, we omit discussion of the generation of C functions for primitives and constructors. We generate 'always inline' directives on all generated C functions, including those generated for primitives and constructors, except for main and those selected to break cycles in the call graph.

Note that with a polyvariant union-free flow analysis, the target of every call site is known. This allows generating direct function calls or inlined primitives for each call site. Calls to the AD primitives involve nothing more than rearrangements of (aggregate) data structures from one known fixed shape to another known fixed shape. As aggregate data is unboxed and calls to primitives are inlined, this usually gets compiled away.

2-7 Examples

We illustrate the power of our flow-analysis and code-generation techniques for first-class forward AD with two examples. These examples were chosen because they illustrate a hierarchy of mathematical abstractions built on top of a higher-order derivative operator and the utility of nested application of those abstractions. Variants of both examples appear in other papers. However, those papers do not employ either the flow-analysis or code-generation techniques discussed here. We include these examples here to show how our techniques can be used to generate efficient FORTRAN-like code for these examples.

FIG. 9 gives common code shared between these examples. In addition to fairly self-explanatory code, the functions v+ and v− perform vector addition and subtraction, k*v multiplies a vector by a scalar, e returns the i-th basis vector of dimension n, map-n maps a function over the list (0 ... n−1), and multivariate-argmin implements a multivariate optimizer using adaptive naive gradient descent. This iterates $x_{i+1} = \eta \nabla f x_i$ until either $\|\nabla f x\|$ or $\|x_{i+1} - x_i\|$ is small, increasing $\eta$ when progress is made and decreasing $\eta$ when no progress is made.

FIG. 10 contains the first example, saddle, that computes the saddle point of a function:

$$\min_{(x_1, y_1)} \max_{(x_2, y_2)} (x_1^2 + y_1^2) - (x_2^2 + y_2^2)$$

This example uses forward AD instead of reverse AD to compute gradients and naive gradient descent instead of gradient descent with a line search.

FIG. 11 contains the second example, particle, a variant of an example from Siskind and Pearlmutter where the textbook Newton's method for optimization has been replaced with naive gradient descent. (The original example was coded in SCHEME; the variant here is coded in VLAD.) It models a charged particle traveling non-relativistically in a plane with position $\vec{x}(t)$ and velocity $\dot{x}(t)$. The particle is accelerated by an electric field formed by a pair of repulsive bodies, $$p(x:w) = \|x - (10, 10 - w)\|^{-1} + \|x - (10, 0)\|^{-1}$$

where w is a modifiable control parameter of the system, and hits the x-axis at position $x(t_f)$. We optimize w so as to minimize $E(w) = x_0(t_f^-)^2$, with the goal of finding a value for w that causes the particle's path to intersect the origin. We use Naive Euler ODE integration:

$$\ddot{x}(t) = -\nabla_x p(x)|_{x = x(t)}$$

$$\dot{x}(t + \Delta t) = \dot{x}(t) + \Delta t \ddot{x}(t)$$

$$x(t + \Delta t) = x(t) + \Delta t \dot{x}(t)$$

to compute the particle's path. We use linear interpolation to find the point where the particle hits the x-axis:

When $x_1(t + \Delta t) \leq 0$ let: $\Delta t_f = \dfrac{x_1(t + \Delta t) - x_1(t)}{\dot{x}_1(t)}$ $t_f = t + \Delta t_f$ $x(t_f) = x(t) + \Delta t_f \dot{x}(t)$ Error: $E(w) = x_0(t_f)^2$ We minimize E with respect to w using multivariate-argmin. These examples were chosen because they both illustrate several important characteristics of our compilation techniques. First, they use convenient standard vector arithmetic which, without our techniques, would require allocation and reclamation of new vector objects whose size might be unknown at compile time. Furthermore, access to the components of such vectors would require indirection. Second, they use higher-order functions: ones like map and reduce that are familiar to the functional-programming community and ones like derivative, gradient, and multivariate-argmin, that are familiar to mathematicians. Without our techniques, these would require closures and indirect function calls to unspecified targets. Third, they compute nested derivatives, i.e., they take derivatives of functions that take derivatives of other functions. This involves nested application of the AD primitives which, without our techniques, would require run-time code transformation, and bundling and unbundling of values.

We used STALIN∇ to perform a polyvariant union-free flow analysis on both of these examples using the methods of section 5-5 and to generate FORTRAN-like code in light of such analyses using the methods of section 5-6. We then coded variants of these examples in SCHEME, ML, HASKELL, and C++ and ran them with a variety of compilers and AD implementations. For SCHEME, we used two implementations of forward AD. When compiling with MIT SCHEME we used SCMUTILS and when compiling with STALIN, SCHEME->C, CHICKEN, BIGLOO, and LARCENY we used the implementation of forward AD from Siskind and Pearlmutter, an eager variant of a prior implementation from Pearlmutter and Siskind without the tower. For ML, we used a translation of the latter and compiled the code with MLTON and OCAML. For HASKELL, we used the simplified nontower version of the forward AD method from Karczmarczuk (as presented by Siskind and Pearlmutter) and compiled the code with GHC. For c++, we used the FADBAD++ implementation of forward AD and compiled the code with G++. In all of the variants, we attempted to be faithful to both the generality of the mathematical concepts represented in the examples and to the standard coding style typically used for each particular language.

TABLE 1

| | STALIN | SCHEME -> C | CHICKEN | BIGLOO | GAMBIT | LARCENY | SCMUTILS | MLTON | OCAML | FADBAD++ |
|---|---|---|---|---|---|---|---|---|---|---|
| saddle | 54.17 | 63.67 | 131.59 | 92.04 | 72.27 | 106.81 | 396.70 | 6.41 | 11.93 | 104.88 |
| particle | 249.99 | 318.76 | 607.20 | 449.21 | 343.75 | 549.47 | 1507.16 | 32.98 | 58.15 | 75.08 |

Table 1 summarizes the run times of our examples normalized relative to a unit run time for STALIN∇. It is difficult to conduct meaningful and precise performance comparisons of multiple implementations of forward AD across multiple implementations of multiple programming languages. Changes in coding style, compiler options, and other aspects of our comparison methodology are likely to affect the run times by perhaps a few tens of percent. Thus we do not wish to draw conclusions from the particular measured run times. However, we consider it unlikely that changes in coding style, compiler options, and other aspects of our comparison methodology would improve run times by an order of magnitude. Thus we consider it significant that STALIN outperforms all of the other systems on both examples by between approximately one and three orders of magnitude.

2-8 Discussion

Early transformation-based AD implementations were simple. Such systems, however, produced inefficient transformed source code. As the field of AD evolved, transformation-based systems started employing increasingly sophisticated analyses and transformations with the goal of producing efficient transformed source code. These analyses and transformations mirror the analyses and transformations done by compilers, leading to tremendous redundancy. Furthermore, the AD community is slowly and systematically rediscovering techniques that have been known in the compiler community for years, reimplementing them in various combinations for AD transformers for different programming languages. This motivates including AD in the compiler. Indeed, there is such a commercial effort to incorporate AD into the NAG FORTRAN compiler.

Since at least 1976, the programming-language community has realized the benefits of using variants of the lambda calculus as compiler intermediate languages. However, as of yet, the AD community has not adopted the lambda calculus as the intermediate language for transformation-based AD. For example, OPENAD, a recent framework for integrating compiler optimizations with AD transformations, is not based on the lambda calculus. In contrast, the approach we advocate is illustrated in FIG. 5. VLAD is but one potential front end. Front ends for other languages can be constructed given a suitable extension of the intermediate language. Both AD transformations and compiler analyses and optimizations apply to this intermediate language. Back ends can be constructed to generate either machine code or source code in a variety of languages. This allows the common core of AD techniques to be shared among AD implementations for multiple languages either as part of a compiler or as part of a traditional transformation based preprocessor.

3. Map-Closure Implementation

This section presents code for a complete implementation incorporating a general-purpose dynamic nestable nonstandard interpretation construct called MAP-CLOSURE. This construct has many applications in and beyond AD, and this implementation supports such applications. Implementations of a restricted version, used only for Automatic Differentiation, are incorporated in the VLAD interpreter and compiler.

4 Hardware

Figure 6:
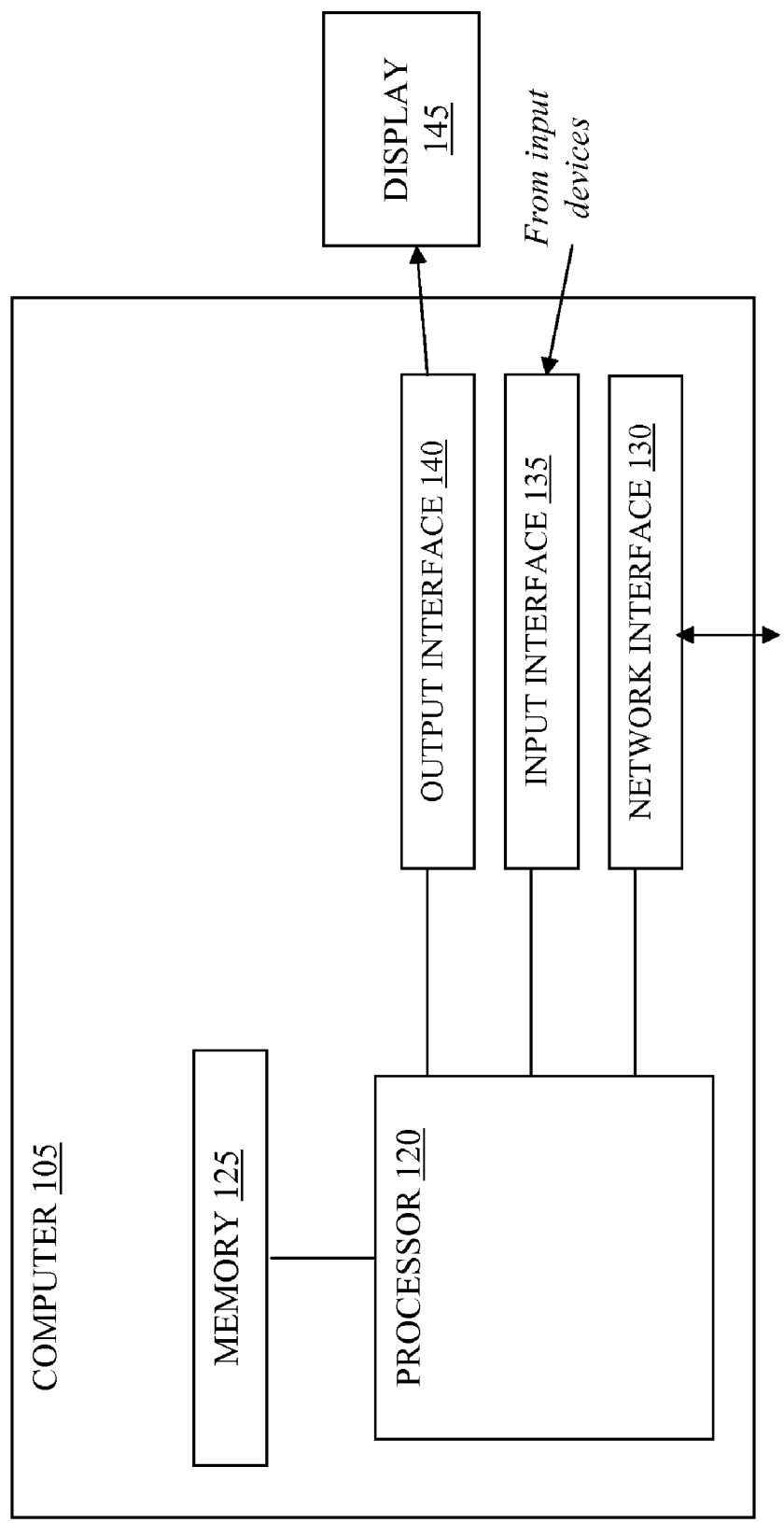
FIG. 6 is a block diagram of a computing device on which the disclosed activities occur.

All of the software execution, compiling, interpretation, and other activities described in this disclosure are implemented on computing devices. For example, FIG. 6 shows a system 100 with a computer 105 and storage 110 connected to a data network (not shown). Computer 105 in this embodiment includes processor 120, memory 125, network interface 130, input interface 135, and output interface 140 as will be understood by those skilled in the art. Power, ground, clock, sensors, and other signals and circuitry are omitted for clarity, but will be understood and easily implemented by those skilled in the art.

Network interface 130 in this embodiment connects computer 105 to network 115 for communication of data between server 105 and other devices attached to the data network. Input interface 135 manages communication between processor 120 and one or more push-buttons, UARTs, IR and/or RF receivers or transceivers, decoders, or other devices, as well as traditional keyboard and mouse devices. Output interface 140 provides a video signal to display 145, and may provide signals to one or more additional output devices such as LEDs, LCDs, or audio output devices, or a combination of these and other output devices and techniques as will occur to those skilled in the art.

Processor 120 in some embodiments is a microcontroller or general purpose microprocessor that reads its program from memory 125. Processor 120 may be comprised of one or more components configured as a single unit. Alternatively, when of a multi-component form, processor 120 may have one or more components located remotely relative to the others. One or more components of processor 120 may be of the electronic variety including digital circuitry, analog circuitry, or both. In one embodiment, processor 120 is of a conventional, integrated circuit microprocessor arrangement, such as one or more PENTIUM 4 or XEON processors from INTEL Corporation of 2200 Mission College Boulevard, Santa Clara, Calif. 95052, USA, or ATHLON XP or OPTERON processors from Advanced Micro Devices, One AMD Place, Sunnyvale, Calif. 94088, USA. In alternative embodiments, one or more application-specific integrated circuits (ASICs), general-purpose microprocessors, programmable logic arrays, or other devices may be used alone or in combination as will occur to those skilled in the art.

Likewise, memory 125 in various embodiments includes one or more types such as solid-state electronic memory, magnetic memory, or optical memory, just to name a few. By way of non-limiting example, memory 125 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge media; or a combination of these memory types. Also, memory 125 is volatile, nonvolatile, or a hybrid combination of volatile and nonvolatile varieties.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A computing system, comprising a processor and a memory in communication with the processor, the memory storing programming instructions executable by the processor to, from outside the body of a first closure having one or more entries that map one or more free variables to their respective bindings, access the content of the first closure and make a second closure, the making comprising:
    copying the body of the first closure, and
    modifying values to which free variables of the second closure are bound relative to the free variables of the first closure;
wherein the making process preserves the identities of the free variables through the modifying step.

2. The system of claim 1, wherein:
the copy is made by applying a specified function to the slot values in the closure, and
where each slot value in the new closure is derived by applying the specified function to the corresponding slot in the existing closure.

3. The system of claim 2,
wherein the making process
    is applied recursively to traverse and locally redefine all reachable functions and variable values in a program, and
    does not affect the reachable functions and values of variables outside a local scope of redefinition;
wherein the local scope of redefinition is defined dynamically based on the invocation pattern of the program.

4. The system of claim 3, wherein the making process is effective to perform a nonstandard interpretation process.

5. The system of claim 3, wherein the making process is applied to compose two or more nonstandard interpretation processes.

6. The system of claim 4, wherein the making process is applied to compose two or more nested nonstandard interpretation processes.

7. The system of claim 4, wherein the nonstandard interpretation process comprises a debugging process.

8. The system of claim 4, wherein the nonstandard interpretation process comprises an execution tracing process.

9. The system of claim 4, wherein the nonstandard interpretation process comprises logging during execution of the program.

10. The system of claim 9, wherein the logging comprises logging of errors during execution of the program.

11. The system of claim 4, wherein the nonstandard interpretation process ensures the safety of the executing program.

12. The system of claim 4, wherein the nonstandard interpretation process comprises measuring utilization of resources during execution of the program.

13. The system of claim 5, wherein the nonstandard interpretation process comprises patching code in the program as it executes.

14. The system of claim 5, wherein the nonstandard interpretation process comprises enforcing a security policy on execution of the program.

15. The system of claim 5, wherein the nonstandard interpretation process comprises at least one of:
    redefining semantics of a programming language, and
    redefining semantics of a library.

16. The system of claim 15, wherein the nonstandard interpretation process implements automatic differentiation.

17. The system of claim 15, wherein the nonstandard interpretation process redefines the input/output semantics of the program to operate transparently with a plurality of user interfaces.

18. The system of claim 17, wherein at least one of the user interfaces is a web browser.

19. The system of claim 4,
further comprising a call-with-current-continuation operation;
wherein the modifying step and the call-with-current-continuation operation are effective to implement mutation.

20. The system of claim 2, wherein the copying and the modification are facilitated by closure conversion.

21. The system of claim 2, wherein the copying and the modification are optimized by flow analysis, abstract interpretation, and partial evaluation.

22. A system, comprising a processor and a memory in communication with the processor, the memory storing instructions executable by the processor to implement an API for programmatically applying nonstandard interpretation to a given program.

23. The system of claim 22, wherein the given program also applies nonstandard interpretation to another program.

* * * * *